US009497734B2

(12) United States Patent
Noh et al.

(10) Patent No.: US 9,497,734 B2
(45) Date of Patent: Nov. 15, 2016

(54) METHOD AND APPARATUS FOR TRANSMITTING UPLINK REFERENCE SIGNAL IN WIRELESS COMMUNICATION SYSTEM

(75) Inventors: Min Seok Noh, Anyang-si (KR); Jae Hoon Chung, Anyang-si (KR); Hyun Soo Ko, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 115 days.

(21) Appl. No.: 14/239,010

(22) PCT Filed: Aug. 16, 2012

(86) PCT No.: PCT/KR2012/006508
§ 371 (c)(1),
(2), (4) Date: Feb. 14, 2014

(87) PCT Pub. No.: WO2013/025054
PCT Pub. Date: Feb. 21, 2013

(65) Prior Publication Data
US 2014/0211736 A1 Jul. 31, 2014

Related U.S. Application Data

(60) Provisional application No. 61/523,856, filed on Aug. 16, 2011, provisional application No. 61/537,064, filed on Sep. 21, 2011, provisional application No. 61/538,149, filed on Sep. 23, 2011, provisional (Continued)

(51) Int. Cl.
*H04W 72/02* (2009.01)
*H04W 56/00* (2009.01)
(Continued)

(52) U.S. Cl.
CPC ............ *H04W 72/02* (2013.01); *H04L 5/0035* (2013.01); *H04L 5/0051* (2013.01);
(Continued)

(58) Field of Classification Search
None
See application file for complete search history.

(56) References Cited

U.S. PATENT DOCUMENTS

2010/0189038 A1\* 7/2010 Chen et al. .................. 370/328
2011/0077038 A1\* 3/2011 Montojo et al. ............. 455/507
(Continued)

FOREIGN PATENT DOCUMENTS

KR 10-2010-0118534 A 11/2010
KR 10-2011-0000536 A 1/2011
(Continued)

OTHER PUBLICATIONS

3GPP, "3rd Generation Partnership Project; Technical Specification Group Radio Access Network; Evolved Universal Terrestial Radio Access (E-UTRA); Physical Channels and Modulation (Release 10)," 3GPP TS 36.211 V10.2.0, Jun. 2011, pp. 1-16.
(Continued)

*Primary Examiner* — Dang Ton
*Assistant Examiner* — Ronald H Davis
(74) *Attorney, Agent, or Firm* — Birch, Stewart, Kolasch & Birch, LLP

(57) ABSTRACT

Provided are a method and an apparatus for transmitting an uplink (UL) reference signal (RS) in a wireless communication system. A first user equipment (UE) served through a macro eNodeB (eNB) generates a first UL RS on the basis of a first indicator and transmits the generated first UL RS. A second UE served through a pico eNB having the same cell identifier (ID) as the macro eNB generates a second UL RS on the basis of a second indicator and transmits the generated second UL RS. The bandwidth to which the first UL RS is transmitted is overlapped with the bandwidth to which the second UL RS is transmitted.

14 Claims, 10 Drawing Sheets

Related U.S. Application Data application No. 61/539,999, filed on Sep. 28, 2011, provisional application No. 61/545,580, filed on Oct. 10, 2011, provisional application No. 61/557,388, filed on Nov. 8, 2011, provisional application No. 61/560,246, filed on Nov. 15, 2011, provisional application No. 61/560,814, filed on Nov. 17, 2011, provisional application No. 61/561,233, filed on Nov. 17, 2011.

(51) Int. Cl.
*H04L 27/26* (2006.01)
*H04L 5/00* (2006.01)
*H04B 7/02* (2006.01)

(52) U.S. Cl.
CPC .......... *H04L 5/0073* (2013.01); *H04L 27/261* (2013.01); *H04W 56/0005* (2013.01); *H04B 7/024* (2013.01); *H04L 5/0016* (2013.01); *H04L 5/0055* (2013.01); *H04L 5/0057* (2013.01)

(56) References Cited

U.S. PATENT DOCUMENTS

| | | | |
|---|---|---|---|
| 2011/0103509 A1* | 5/2011 | Chen et al. | 375/295 |
| 2011/0142107 A1 | 6/2011 | Pan et al. | |
| 2011/0158191 A1* | 6/2011 | Zhang et al. | 370/329 |
| 2011/0176502 A1 | 7/2011 | Chung et al. | |
| 2011/0199986 A1* | 8/2011 | Fong et al. | 370/329 |
| 2011/0249648 A1* | 10/2011 | Jen | 370/330 |
| 2011/0256868 A1 | 10/2011 | Nogami et al. | |
| 2011/0267972 A1* | 11/2011 | Yoon et al. | 370/252 |
| 2011/0268077 A1* | 11/2011 | Wan et al. | 370/329 |
| 2011/0268102 A1* | 11/2011 | Zhu et al. | 370/345 |
| 2012/0093120 A1 | 4/2012 | Ko et al. | |
| 2012/0108253 A1* | 5/2012 | Mao et al. | 455/450 |
| 2012/0113910 A1* | 5/2012 | Jen | 370/329 |
| 2012/0281656 A1* | 11/2012 | Hooli et al. | 370/329 |
| 2013/0343316 A1* | 12/2013 | Pajukoski et al. | 370/329 |
| 2014/0079009 A1* | 3/2014 | Liu et al. | 370/329 |

FOREIGN PATENT DOCUMENTS

| | | |
|---|---|---|
| KR | 10-2011-0089191 A1 | 8/2011 |
| WO | WO 2011/035590 A1 | 3/2011 |
| WO | WO 2011/041552 A1 | 4/2011 |
| WO | WO 2011/081390 A2 | 7/2011 |

OTHER PUBLICATIONS

Ericsson et al., "Views on remaining issues for SGH," 3GPP TSG RAN WG1 Meeting #63, R1-105876, Jacksonville, USA, Nov. 15-19, 2010, pp. 1-4.

ETRI, "Discussion on further details of Scenario 4," 3GPP TSG RAN WG1 Meeting #64, R1-111000, Taipei, Taiwan, Feb. 21-25, 2011, pp. 1-3.

Pantech, "Remain details on SGH in uplink DM-RS," 3GPP TSG RAN WG1, Meeting #63bis, R1-110158, Dublin, Ireland, Jan. 17-21, 2011, pp. 1-2.

* cited by examiner

METHOD AND APPARATUS FOR TRANSMITTING UPLINK REFERENCE SIGNAL IN WIRELESS COMMUNICATION SYSTEM

This application is the National Phase of PCT/KR2012/006508 filed on Aug. 16, 2012, which claims priority under 35 U.S.C. 119(e) to US Provisional Application Nos. 61/523,856 filed on Aug. 16, 2011, 61/537,064 filed on Sep. 21, 2011, 61/538,149 filed on Sep. 23, 2011, 61/539,999 filed on Sep. 28, 2011, 61/545,580 filed on Oct. 10, 2011, 61/557,388 filed on Nov. 8, 2011, 61/560,246 filed on Nov. 15, 2011, 61/560,814 filed on Nov. 17, 2011 and 61/561,233 filed on Nov. 17, 2011, all of which are hereby expressly incorporated by reference into the present application.

BACKGROUND OF THE INVENTION

1. Field of the Invention

The present invention relates to wireless communications, and more particularly, to a method and apparatus for transmitting an uplink reference signal in a wireless communication system.

2. Related Art

The next-generation multimedia wireless communication systems which are recently being actively researched are required to process and transmit various pieces of information, such as video and wireless data as well as the initial voice-centered services. The 4th generation wireless communication systems which are now being developed subsequently to the 3rd generation wireless communication systems are aiming at supporting high-speed data service of downlink 1 Gbps (Gigabits per second) and uplink 500 Mbps (Megabits per second). The object of the wireless communication system is to establish reliable communications between a number of users irrespective of their positions and mobility. However, a wireless channel has abnormal characteristics, such as path loss, noise, a fading phenomenon due to multi-path, inter-symbol interference (ISI), and the Doppler Effect resulting from the mobility of a user equipment. A variety of techniques are being developed in order to overcome the abnormal characteristics of the wireless channel and to increase the reliability of wireless communication.

In wireless communication systems, it is necessary to estimate an uplink channel or a downlink channel for the purpose of the transmission and reception of data, the acquisition of system synchronization, and the feedback of channel information. In wireless communication system environments, fading is generated because of multi-path time latency. A process of restoring a transmit signal by compensating for the distortion of the signal resulting from a sudden change in the environment due to such fading is referred to as channel estimation. It is also necessary to measure the state of a channel for a cell to which a user equipment belongs or other cells. To estimate a channel or measure the state of a channel, a reference signal (RS) which is known to both a transmitter and a receiver can be used.

A subcarrier used to transmit the reference signal is referred to as a reference signal subcarrier, and a subcarrier used to transmit data is referred to as a data subcarrier. In an OFDM system, a method of assigning the reference signal includes a method of assigning the reference signal to all the subcarriers and a method of assigning the reference signal between data subcarriers. The method of assigning the reference signal to all the subcarriers is performed using a signal including only the reference signal, such as a preamble signal, in order to obtain the throughput of channel estimation. If this method is used, the performance of channel estimation can be improved as compared with the method of assigning the reference signal between data subcarriers because the density of reference signals is in general high. However, since the amount of transmitted data is small in the method of assigning the reference signal to all the subcarriers, the method of assigning the reference signal between data subcarriers is used in order to increase the amount of transmitted data. If the method of assigning the reference signal between data subcarriers is used, the performance of channel estimation can be deteriorated because the density of reference signals is low. Accordingly, the reference signals should be properly arranged in order to minimize such deterioration.

A receiver can estimate a channel by separating information about a reference signal from a received signal because it knows the information about a reference signal and can accurately estimate data, transmitted by a transmit stage, by compensating for an estimated channel value. Assuming that the reference signal transmitted by the transmitter is p, channel information experienced by the reference signal during transmission is h, thermal noise occurring in the receiver is n, and the signal received by the receiver is y, it can result in y=h·p+n. Here, since the receiver already knows the reference signal p, it can estimate a channel information value $\hat{h}$ using Equation 1 in the case in which a Least Square (LS) method is used.

$$\hat{h}=y/p=h+n/p=h+\hat{n} \qquad \text{<Equation 1>}$$

The accuracy of the channel estimation value $\hat{h}$ estimated using the reference signal p is determined by the value $\hat{n}$. To accurately estimate the value h, the value $\hat{n}$ must converge on 0. To this end, the influence of the value $\hat{n}$ has to be minimized by estimating a channel using a large number of reference signals. A variety of algorithms for a better channel estimation performance may exist.

In the $3^{rd}$ generation partnership project (3GPP) long term evolution advanced (LTE-A) rel-11, a new deployment scenario may be discussed. Deployment scenario A represents the network that is made up of the indoor and outdoor low power radio remote heads (RRHs) located within the coverage of the macro cell, and the transmission/reception point generated by the RRHs has the cell ID that is identical to that of the macro cell. Deployment scenario A may be called to coordinated multi-point (CoMP) scenario 4. Deployment scenario B represents the network that is made up of indoor and outdoor small cells only. Deployment scenario C represents the network that is made up of indoor and outdoor low power RRHs only, and all of the transmission/reception points generated by the RRHs have the same cell IDs. Deployment scenario D represents the network that is made up of the heterogeneous deployment of the small cell within the indoor and outdoor coverage, and the low power RRHs located in the coverage of the macro cell have a different cell ID with the macro cell. Deployment scenario D may be called to CoMP scenario 3.

By the new deployment scenarios being discussed, it may be necessary to improve the performance on the uplink (UL) demodulation reference signal (DMRS).

SUMMARY OF THE INVENTION

The present invention provides a method and apparatus for transmitting an uplink reference signal in a wireless communication system. The present invention provides a method for applying a virtual cell identifier (ID), an orthogonal cover code (OCC), a cyclic shift, and the like, in order to guarantee orthogonality of uplink (UL) demodulation reference signals (DMRSs) of different user equipments, which belong to different cells with one another.

In an aspect, a method for receiving, by a macro eNodeB (eNB), an uplink (UL) reference signal (RS) in a wireless communication system is provided. The method includes allocating a first identifier to a first user equipment (UE) which is served by the macro eNB, allocating a second identifier to a second UE which is served by a pico eNB, which has the same cell identifier (ID) as the macro eNB and exists within a coverage of the macro eNB, receiving a first UL RS which is generated based on the first identifier through a first bandwidth, from the first UE, and receiving a second UL RS which is generated based on the second identifier through a second bandwidth that overlaps with the first bandwidth, from the second UE.

The first identifier and the second identifier may be different virtual cell IDs each other.

The first identifier and the second identifier may be different cyclic shifts each other.

The first UL RS and the second UL RS may be the first UL demodulation reference signal (DMRS) and the second UL DMRS, respectively.

The first identifier and the second identifier may be different orthogonal cover code (OCC) indices each other.

The first UL RS and the second UL RS may be a first UL sounding reference signal (SRS) and a second UL SRS, respectively.

The first identifier and the second identifier may be different transmission comb indices each other.

The first identifier and the second identifier may be allocated through a physical downlink control channel (PD-CCH), or allocated through a radio resource control (RRC) signaling.

Cyclic shift hopping patterns of the first UL RS and the second UL RS may be identical.

The cyclic shift hopping patterns of the first UL RS and the second UL RS may be configured based on the cell ID of the macro eNB and the cell ID of the pico eNB, which are identical.

A sequence group hopping and a sequence hopping among slots may be not applied for the first UL RS and the second UL RS.

A width of the first bandwidth and a width of the second bandwidth may be different each other.

In another aspect, a macro eNodeB (eNB) for receiving an uplink (UL) reference signal (RS) in a wireless communication system is provided. The macro eNB includes a radio frequency (RF) unit for transmitting or receiving a radio signal, and a processor connected to the RF unit, and configured to allocate a first identifier to a first user equipment (UE) which is served by the macro eNB, allocate a second identifier to a second UE which is served by a pico eNB, which has the same cell identifier (ID) as the macro eNB and exists within a coverage of the macro eNB, receive a first UL RS which is generated based on the first identifier through a first bandwidth, from the first UE, and receive a second UL RS which is generated based on the second identifier through a second bandwidth that overlaps with the first bandwidth, from the second UE.

In CoMP scenario 4 or CoMP scenario 3, the orthogonality of the UL DMRSs of different user equipments, which belong to different cells with one another, may be guaranteed.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (Evolved UTRA), and the like. IEEE 802.16m, an evolution of IEEE 802.16e, provides backward compatibility with a system based on IEEE 802.16e. The UTRA is part of a universal mobile telecommunications system (UMTS). 3$^{rd}$ generation partnership project (3GPP) long term evolution (LTE) is part of an evolved UMTS (E-UMTS) using the E-UTRA, which employs the OFDMA in downlink and the SC-FDMA in uplink. LTE-advanced (LTE-A) is an evolution of 3GPP LTE.

Hereinafter, for clarification, LTE-A will be largely described, but the technical concept of the present invention is not meant to be limited thereto.

Figure 1:
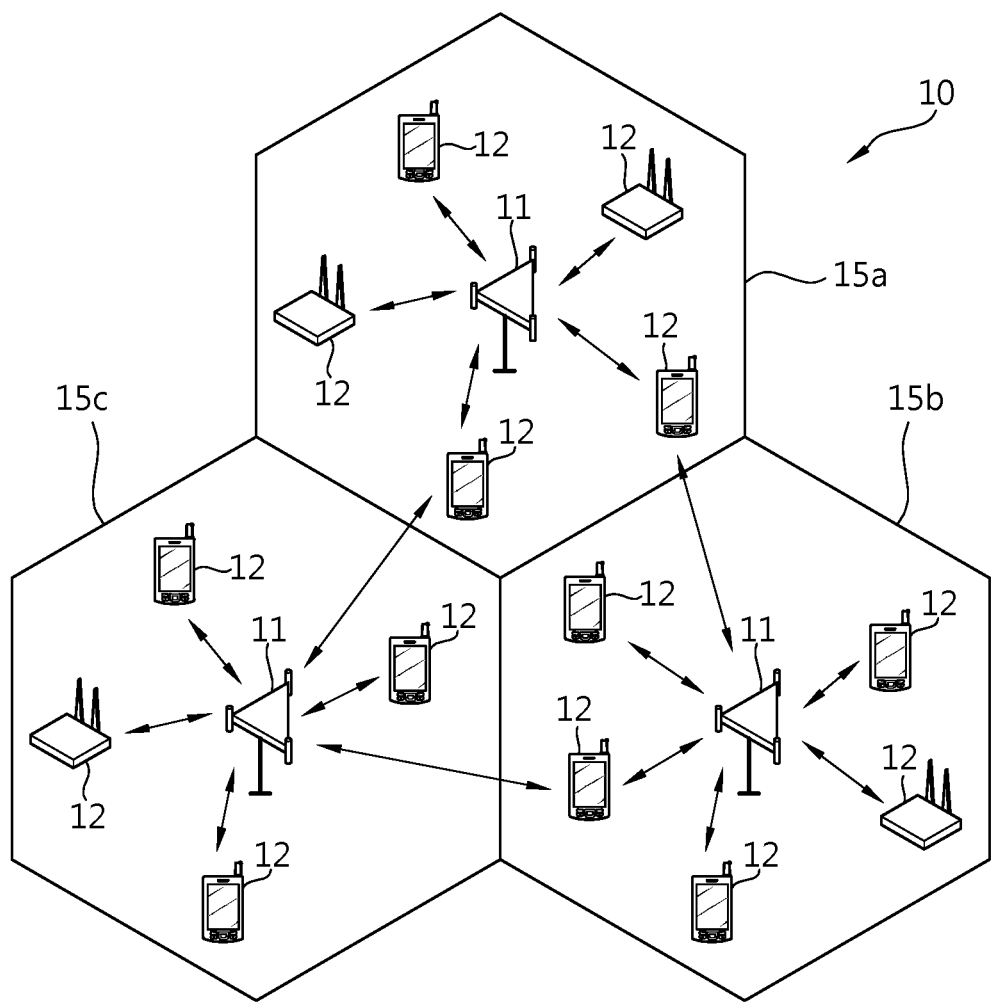
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile user equipment (MT), user user equipment (UT), subscriber station (SS), wireless device, personal digital assistant (PDA), wireless modem, handheld device. The BS 11 generally refers to a fixed station that communicates with the UE 12 and may be called by other names such as evolved-NodeB (eNB), base transceiver system (BTS), access point (AP), etc.

In general, a UE belongs to one cell, and the cell to which a UE belongs is called a serving cell. ABS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
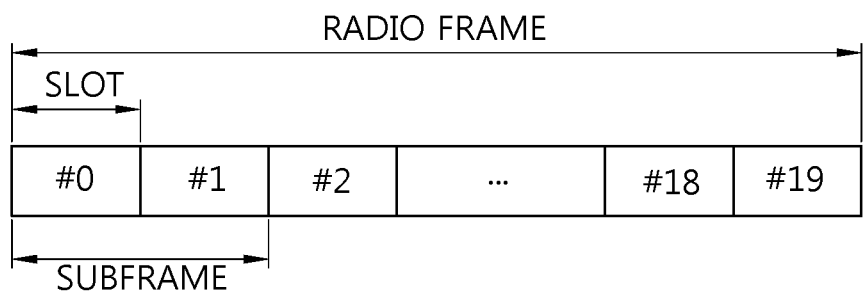
FIG. 2 shows a structure of a radio frame in 3GPP LTE.

FIG. 2 shows a structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03). Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when SC-FDMA is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE cannot be simultaneously performed. In a TDD system in which an uplink transmission and a downlink transmission are discriminated in units of subframes, the uplink transmission and the downlink transmission are performed in different subframes.

Figure 3:
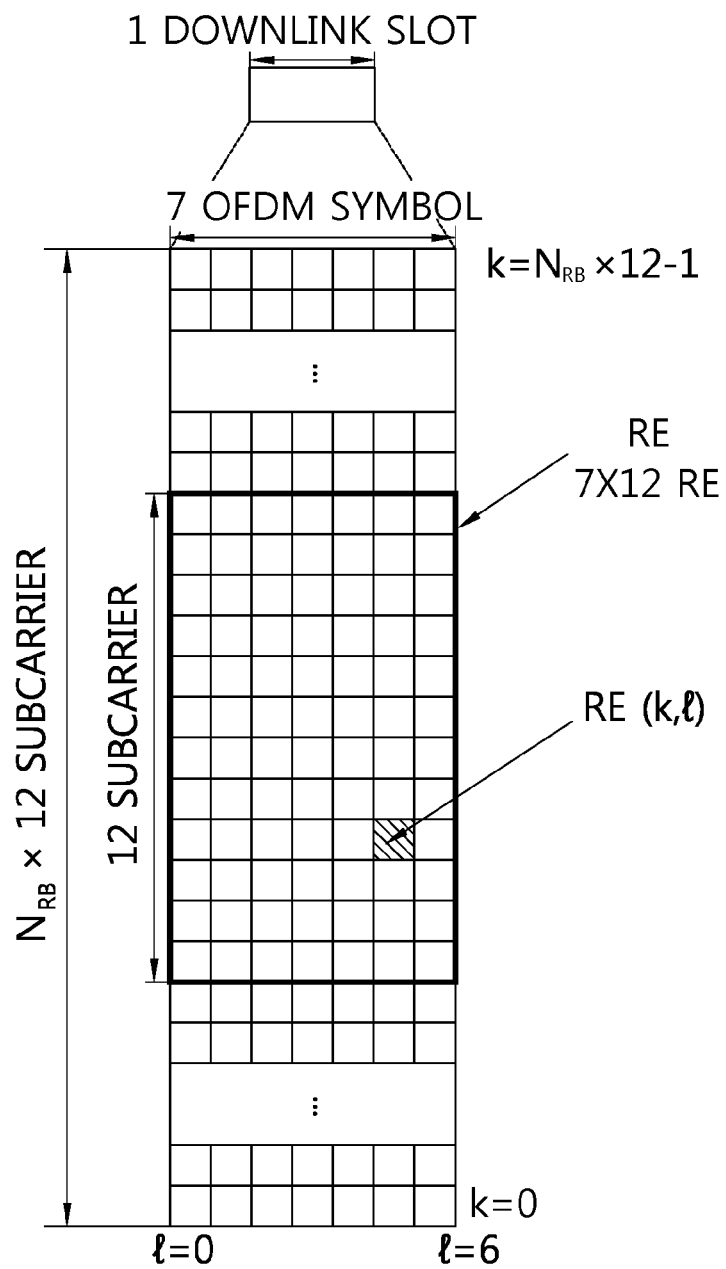
FIG. 3 shows an example of a resource grid of a single downlink slot.

FIG. 3 shows an example of a resource grid of a single downlink slot.

A downlink slot includes a plurality of OFDM symbols in the time domain and NRB number of resource blocks (RBs) in the frequency domain. The NRB number of resource blocks included in the downlink slot is dependent upon a downlink transmission bandwidth set in a cell. For example, in an LTE system, NRB may be any one of 6 to 110. One resource block includes a plurality of subcarriers in the frequency domain. An uplink slot may have the same structure as that of the downlink slot.

Each element on the resource grid is called a resource element. The resource elements on the resource grid can be identified by a pair of indices (k,l) in the slot. Here, k (k=0, . . . , $N_{RB} \times 12-1$) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a CP, frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
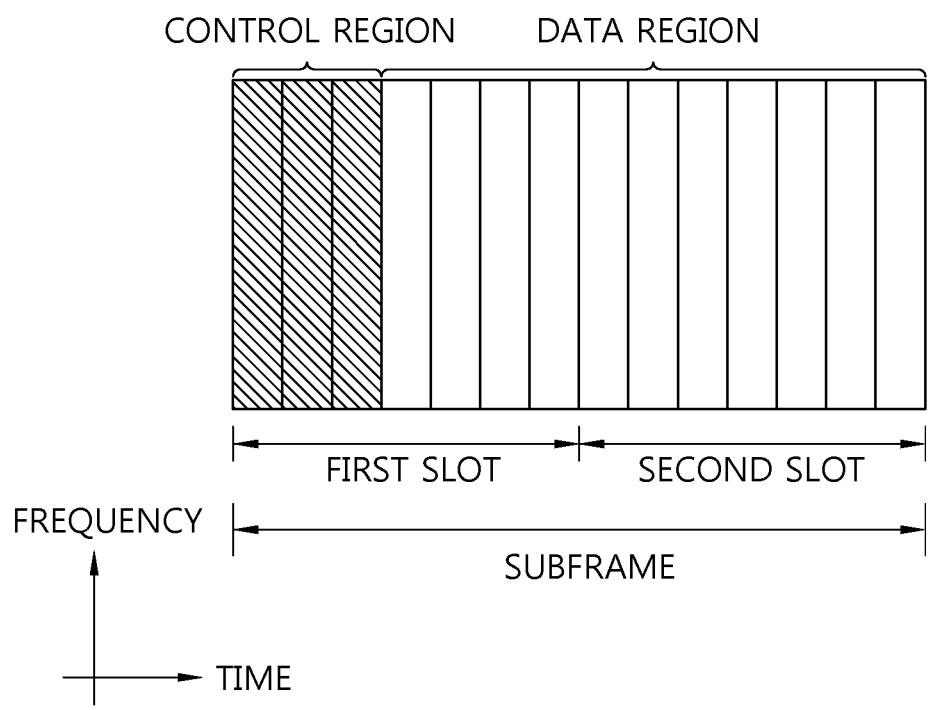
FIG. 4 shows a structure of a downlink subframe.

FIG. 4 shows a structure of a downlink subframe.

A downlink subframe includes two slots in the time domain, and each of the slots includes seven OFDM symbols in the normal CR First three OFDM symbols (maximum four OFDM symbols for a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCE corresponds to a plurality of resource element groups. The format of the PDCCH and an available number of bits of the PDCCH are determined according to an associative relation between the number of the CCEs and a coding rate provided by the CCEs.

The BS determines a PDCCH format according to a DCI to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC.

Figure 5:
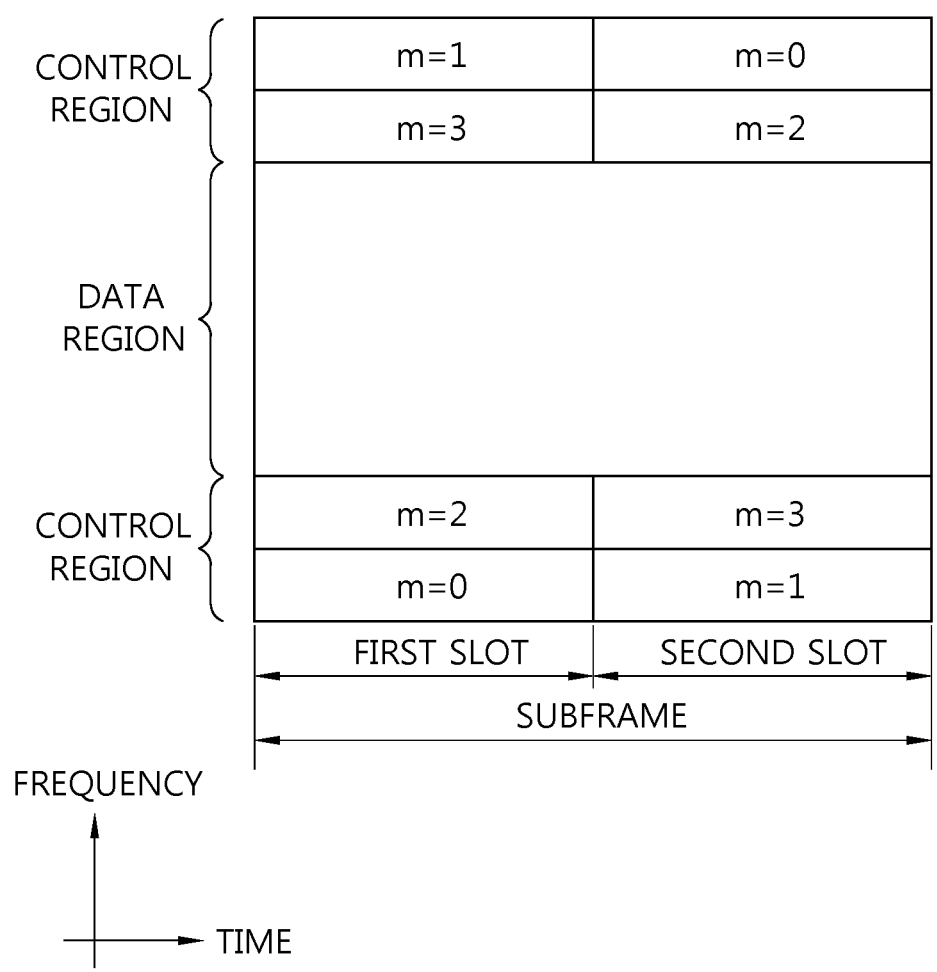
FIG. 5 shows a structure of an uplink subframe.

FIG. 5 shows a structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. When indicated by a higher layer, the UE may support a simultaneous transmission of the PUSCH and the PUCCH.

The PUCCH for a UE is allocated by a pair of RBs in a subframe. The resource blocks belonging to the pair of RBs occupy different subcarriers in first and second slots, respectively. The frequency occupied by the RBs belonging to the pair of RBs is changed based on a slot boundary. This is said that the pair of RBs allocated to the PUCCH is frequency-hopped at the slot boundary. The UE can obtain a frequency diversity gain by transmitting uplink control information through different subcarriers according to time. In FIG. 5, m is a position index indicating the logical frequency domain positions of the pair of RBs allocated to the PUCCH in the subframe.

Uplink control information transmitted on the PUCCH may include a hybrid automatic repeat request (HARQ) acknowledgement/non-acknowledgement (ACK/NACK), a channel quality indicator (CQI) indicating the state of a downlink channel, a scheduling request (SR), and the like.

The PUSCH is mapped to an uplink shared channel (UL-SCH), a transport channel. Uplink data transmitted on the PUSCH may be a transport block, a data block for the UL-SCH transmitted during the TTL The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

A UL reference signal is described below.

In general, the reference signal is transmitted in the form of a sequence. A specific sequence may be used as the reference signal sequence without a special limit. A phase shift keying (PSK)-based computer generated sequence may be used as the reference signal sequence. Examples of PSK include binary phase shift keying (BPSK) and quadrature phase shift keying (QPSK). Alternatively, a constant amplitude zero auto-correlation (CAZAC) sequence may be used as the reference signal sequence. Examples of the CAZAC sequence include a Zadoff-Chu (ZC)-based sequence, a ZC sequence with cyclic extension, and a ZC sequence with truncation. Alternatively, a pseudo-random (PN) sequence may be used as the reference signal sequence. Examples of the PN sequence include an m-sequence, a computer-generated sequence, a gold sequence, and a Kasami sequence. A cyclically shifted sequence may be used as the reference signal sequence.

A UL reference signal may be divided into a demodulation reference signal (DMRS) and a sounding reference signal (SRS). The DMRS is a reference signal used in channel estimation for the demodulation of a received signal. The DMRS may be associated with the transmission of a PUSCH or PUCCH. The SRS is a reference signal transmitted from a UE to a BS for UL scheduling. The BS estimates an UL channel through the received SRS and uses the estimated UL channel in UL scheduling. The SRS is not associated with the transmission of a PUSCH or PUCCH. The same kind of a basic sequence may be used for the DMRS and the SRS. Meanwhile, in UL multi-antenna transmission, precoding applied to the DMRS may be the same as precoding applied to a PUSCH. Cyclic shift separation is a primary scheme for multiplexing the DMRS. In 3GPP LTE-A system, the SRS may not be precoded and may be an antenna-specific reference signal.

A reference signal sequence $r_{u,v}(\alpha)(n)$ may be defined based on a basic sequence $b_{u,v}(n)$ and a cyclic shift a according to Equation 2.

$$r_{u,v}^{(\alpha)}(n) = e^{j\alpha n} b_{u,v}(n), \quad 0 \leq n < M_{sc}^{RS} \qquad \text{<Equation 2>}$$

In Equation 2, $M_{sc}^{RS}$ ($1 \leq m \leq N_{RB}^{max,UL}$) is the length of the reference signal sequence. and $M_{sc}^{RS} = m \ast N_{sc}^{RB}$. $N_{sc}^{RB}$ is the size of a resource block indicated by the number of subcarriers in the frequency domain. $N_{RB}^{max,UL}$ indicates a maximum value of a UL bandwidth indicated by a multiple of $N_{sc}^{RB}$. A plurality of reference signal sequences may be defined by differently applying a cyclic shift value a from one basic sequence.

A basic sequence $b_{u,v}(n)$ is divided into a plurality of groups. Here, u□{0, 1, . . . , 29} indicates a group number, and v indicates a basic sequence number within the group. The basic sequence depends on the length $M_{sc}^{RS}$ of the basic sequence. Each group includes a basic sequence (v=0) having a length of $M_{sc}^{RS}$ for m ($1 \leq m \leq 5$) and includes 2 basic sequences (v=0,1) having a length of $M_{sc}^{RS}$ for m ($6 \leq m \leq n_{RB}^{max,UL}$). The sequence group number u and the basic sequence number v within a group may vary according to time as in group hopping or sequence hopping.

If the length of the reference signal sequence is $3N_{sc}^{RB}$ or higher, the basic sequence may be defined by Equation 3.

$$b_{u,v}(n) = x_q(n \bmod N_{ZC}^{RS}), \quad 0 \leq n < M_{sc}^{RS} \qquad \text{<Equation 3>}$$

In Equation 3, q indicates a root index of a Zadoff-Chu (ZC) sequence. $N_{ZC}^{RS}$ is the length of the ZC sequence and may be a maximum prime number smaller than $M_{sc}^{RS}$. The ZC sequence having the root index q may be defined by Equation 4.

$$x_q(m) = e^{-j\frac{\pi q m(m+1)}{N_{ZC}^{RS}}}, \qquad \text{⟨Equation 4⟩}$$

$$0 \leq m \leq N_{ZC}^{RS} - 1$$

q may be given by Equation 5.

$$q = \lfloor \bar{q} + 1/2 \rfloor + v \cdot (-1)^{\lfloor 2\bar{q} \rfloor}$$

$$\bar{q} = N_{ZC}^{RS} \cdot (u+1)/31 \qquad \text{<Equation 5>}$$

If the length of the reference signal sequence is $3N_{sc}^{RB}$ or less, the basic sequence may be defined by Equation 6.

$$b_{u,v}(n) = e^{j\phi(n)\pi/4}, \quad 0 \leq n \leq M_{sc}^{RS} - 1 \qquad \text{<Equation 6>}$$

Table 1 is an example where φ(n) is defined when $M_{sc}^{RS}=N_{sc}^{RB}$.

TABLE 1

| | φ(0), . . . , φ(11) | | | | | | | | | | | |
|---|---|---|---|---|---|---|---|---|---|---|---|---|
| 0 | −1 | 1 | 3 | −3 | 3 | 3 | 1 | 1 | 3 | 1 | −3 | 3 |
| 1 | 1 | 1 | 3 | 3 | 3 | −1 | 1 | −3 | −3 | 1 | −3 | 3 |
| 2 | 1 | 1 | −3 | −3 | −3 | −1 | −3 | −3 | 1 | −3 | 1 | −1 |
| 3 | −1 | 1 | 1 | 1 | 1 | −1 | −3 | −3 | 1 | −3 | 3 | −1 |
| 4 | −1 | 3 | 1 | −1 | 1 | −1 | −3 | −1 | 1 | −1 | 1 | 3 |
| 5 | 1 | −3 | 3 | −1 | −1 | 1 | 1 | −1 | −1 | 3 | −3 | 1 |
| 6 | −1 | 3 | −3 | −3 | −3 | 3 | 1 | −1 | 3 | 3 | −3 | 1 |
| 7 | −3 | −1 | −1 | −1 | 1 | −3 | 3 | −1 | 1 | −3 | 3 | 1 |
| 8 | 1 | −3 | 3 | 1 | −1 | −1 | −1 | 1 | 1 | 3 | −1 | 1 |
| 9 | 1 | −3 | −1 | 3 | 3 | −1 | −3 | 1 | 1 | 1 | 1 | 1 |
| 10 | −1 | 3 | −1 | 1 | 1 | −3 | −3 | −1 | −3 | −3 | 3 | −1 |
| 11 | 3 | 1 | −1 | −1 | 3 | 3 | −3 | 1 | 3 | 1 | 3 | 3 |
| 12 | 1 | −3 | 1 | 1 | −3 | 1 | 1 | 1 | −3 | −3 | −3 | 1 |
| 13 | 3 | 3 | −3 | 3 | −3 | 1 | 1 | 3 | −1 | −3 | 3 | 3 |
| 14 | −3 | 1 | −1 | −3 | −1 | 3 | 1 | 3 | 3 | 3 | −1 | 1 |
| 15 | 3 | −1 | 1 | −3 | −1 | −1 | 1 | 1 | 3 | 1 | −1 | −3 |
| 16 | 1 | 3 | 1 | −1 | 1 | 3 | 3 | 3 | −1 | −1 | 3 | −1 |
| 17 | −3 | 1 | 1 | 3 | −3 | 3 | −3 | −3 | 3 | 1 | 3 | −1 |
| 18 | −3 | 3 | 1 | 1 | −3 | 1 | −3 | −3 | −1 | −1 | 1 | −3 |
| 19 | −1 | 3 | 1 | 3 | 1 | −1 | −1 | 3 | −3 | −1 | −3 | −1 |
| 20 | −1 | −3 | 1 | 1 | 1 | 1 | 3 | 1 | −1 | 1 | −3 | −1 |
| 21 | −1 | 3 | −1 | 1 | −3 | −3 | −3 | −3 | −3 | 1 | −1 | −3 |
| 22 | 1 | 1 | −3 | −3 | −3 | −3 | −1 | 3 | −3 | 1 | −3 | 3 |
| 23 | 1 | 1 | −1 | −3 | −1 | −3 | 1 | −1 | 1 | 3 | −1 | 1 |
| 24 | 1 | 1 | 3 | 1 | 3 | 3 | −1 | 1 | −1 | −3 | −3 | 1 |
| 25 | 1 | −3 | 3 | 3 | 1 | 3 | 3 | 1 | −3 | −1 | −1 | 3 |
| 26 | 1 | 3 | −3 | −3 | 3 | −3 | 1 | −1 | −1 | 3 | −1 | −3 |
| 27 | −3 | −1 | −3 | −1 | −3 | 3 | 1 | −1 | 1 | 3 | −3 | −3 |
| 28 | −1 | 3 | −3 | 3 | −1 | 3 | 3 | −3 | 3 | 3 | −1 | −1 |
| 29 | 3 | −3 | −3 | −1 | −1 | −3 | −1 | 3 | −3 | 3 | 1 | −1 |

Table 2 is an example where φ(n) is defined when $M_{sc}^{RS}=2*N_{sc}^{RB}$.

Hopping of a reference signal may be applied as follows.

The sequence group number of a slot $n_s$ may be defined based on a group hopping pattern $f_{gh}(n_s)$ and a sequence shift pattern $f_s$, according to Equation 7.

$$u=(f_{gh}(n_s)+f_{ss}) \bmod 30 \qquad \text{<Equation 7>}$$

17 different group hopping patterns and 30 different sequence shift patterns may exist. The group hopping may be enabled or not enabled by Group-hopping-enabled parameter, which is a cell-specific parameter, provided by a higher-layer. Further, the group hopping for PUSCH may be disabled for a specific UE by Disable-sequence-group-hopping parameter, which is a UE-specific parameter. A PUCCH and PUSCH may have the same group hopping pattern, and may have different sequence shift patterns.

A group hopping pattern $f_{gh}(n_s)$ is the same for the PUSCH and PUCCH, and may be defined by Equation 8.

$$f_{gh}(n_s) = \begin{cases} 0 & \text{if group hopping is disabled} \\ \left(\sum_{i=0}^{7} c(8n_s+i) \cdot 2^i\right) \bmod 30 & \text{if group hopping is enabled} \end{cases} \qquad \text{<Equation 8>}$$

In Equation 8, c(i) is a pseudo random sequence that is a PN sequence and may be defined by a Gold sequence of a length-31. Equation 9 shows an example of a gold sequence c(n).

$$c(n)=(x_1(n+N_c)+x_2(n+N_c)) \bmod 2$$

$$x_1(n+31)=(x_1(n+3)+x_1(n)) \bmod 2$$

$$x_2(n+31)=(x_2(n+3)+x_2(n+2)+x_2(n+1)+x_1(n)) \bmod 2 \qquad \text{<Equation 9>}$$

TABLE 2

| | φ(0), . . . , φ(23) | | | | | | | | | | | | | | | | | | | | | | | |
|---|---|---|---|---|---|---|---|---|---|---|---|---|---|---|---|---|---|---|---|---|---|---|---|---|
| 0 | −1 | 3 | 1 | −3 | 3 | −1 | 1 | 3 | −3 | 3 | 1 | 3 | −3 | 3 | 1 | 1 | −1 | 1 | 3 | −3 | 3 | −3 | −1 | −3 |
| 1 | −3 | 3 | −3 | −3 | −3 | 1 | −3 | −3 | 3 | −1 | 1 | 1 | 1 | 3 | 1 | −1 | 3 | −3 | −3 | 1 | 3 | 1 | 1 | −3 |
| 2 | 3 | −1 | 3 | 3 | 1 | 1 | −3 | 3 | 3 | 3 | 3 | 1 | −1 | 3 | −1 | 1 | 1 | −1 | −3 | −1 | −1 | 1 | 3 | 3 |
| 3 | −1 | −3 | 1 | 1 | 3 | −3 | 1 | 1 | −3 | −1 | −1 | 1 | 3 | 1 | 3 | 1 | −1 | 3 | 1 | 1 | −3 | −1 | −3 | −1 |
| 4 | −1 | −1 | −1 | −3 | −3 | −1 | 1 | 1 | 3 | 3 | −1 | 3 | −1 | 1 | −1 | −3 | 1 | −1 | −3 | −3 | 1 | −3 | −1 | −1 |
| 5 | −3 | 1 | 1 | 3 | −1 | 1 | 3 | 1 | −3 | 1 | −3 | 1 | 1 | −1 | −1 | 3 | −1 | −3 | 3 | −3 | −3 | −3 | 1 | 1 |
| 6 | 1 | 1 | −1 | −1 | 3 | −3 | −3 | 3 | −3 | 1 | −1 | −1 | 1 | −1 | 1 | 1 | −1 | −3 | −1 | 1 | −1 | 3 | −1 | −1 |
| 7 | −3 | 3 | 3 | −1 | −1 | −3 | −1 | 3 | 1 | 3 | 1 | 3 | 1 | 1 | −1 | 3 | 1 | −1 | 1 | 3 | −3 | −1 | −1 | 1 |
| 8 | −3 | 1 | 3 | −3 | 1 | −1 | −3 | 3 | −3 | 3 | −1 | −1 | −1 | −1 | 1 | −3 | −3 | −3 | 1 | −3 | −3 | −3 | 1 | −3 |
| 9 | 1 | 1 | −3 | 3 | 3 | −1 | −3 | −1 | 3 | −3 | 3 | 3 | 3 | −1 | 1 | 1 | −3 | 1 | −1 | 1 | 1 | −3 | 1 | 1 |
| 10 | −1 | 1 | −3 | −3 | 3 | −1 | 3 | −1 | −1 | −3 | −3 | −3 | −1 | −3 | −3 | 1 | −1 | 1 | 3 | 3 | −1 | 1 | −1 | 3 |
| 11 | 1 | 3 | 3 | −3 | −3 | 1 | 3 | 1 | −1 | −3 | −3 | −3 | 3 | 3 | −3 | 3 | 3 | −1 | −3 | 3 | −1 | 1 | −3 | 1 |
| 12 | 1 | 3 | 3 | 1 | 1 | 1 | −1 | −1 | 1 | −3 | 3 | −1 | 1 | 1 | −3 | 3 | 3 | −1 | −3 | 3 | −3 | −1 | −3 | −1 |
| 13 | 3 | −1 | −1 | −1 | −1 | −3 | −1 | 3 | 3 | 1 | −1 | 1 | 3 | 3 | −1 | 1 | 1 | −3 | 1 | 3 | −1 | −3 | 3 | 3 |
| 14 | −3 | −3 | 3 | 1 | 3 | 1 | −3 | 3 | 1 | 3 | 1 | 1 | 3 | 3 | −1 | −1 | −3 | 1 | −3 | −1 | 3 | 1 | 1 | 3 |
| 15 | −1 | −1 | 1 | −3 | 1 | 3 | −3 | 1 | −1 | −3 | −1 | 3 | 1 | 3 | 1 | −1 | −3 | −3 | −1 | −1 | −3 | −3 | −3 | −1 |
| 16 | −1 | −3 | 3 | −1 | −1 | −1 | −1 | 1 | 1 | −3 | 3 | 1 | 3 | 3 | 1 | −1 | 1 | −3 | 1 | −3 | 1 | 1 | −3 | −1 |
| 17 | 1 | 3 | −1 | 3 | 3 | −1 | −3 | 1 | −1 | −3 | 3 | 3 | 3 | −1 | 1 | 1 | 3 | −1 | −3 | −1 | 3 | −1 | −1 | −1 |
| 18 | 1 | 1 | 1 | 1 | 1 | −1 | 3 | −1 | −3 | 1 | 1 | 3 | −3 | 1 | −3 | −1 | 1 | 1 | −3 | −3 | 3 | 1 | 1 | −3 |
| 19 | 1 | 3 | 3 | 1 | −1 | −3 | 3 | −1 | 3 | 3 | 3 | −3 | 1 | −1 | 1 | −1 | −3 | −1 | 1 | 3 | −1 | 3 | −3 | −3 |
| 20 | −1 | −3 | 3 | −3 | −3 | −3 | −1 | −1 | −3 | −1 | −3 | 3 | 1 | 3 | −3 | −1 | 3 | −1 | 1 | −1 | 3 | −3 | 1 | −1 |
| 21 | −3 | −3 | 1 | 1 | −1 | 1 | −1 | 1 | −1 | 3 | 1 | −3 | −1 | 1 | −1 | 1 | −1 | −1 | 3 | 3 | −3 | −1 | 1 | −3 |
| 22 | −3 | −1 | −3 | 3 | 1 | −1 | −3 | −1 | −3 | −3 | 3 | −3 | 3 | −3 | −1 | 1 | 3 | 1 | −3 | 1 | 3 | 3 | −1 | −3 |
| 23 | −1 | −1 | −1 | −1 | 3 | 3 | 3 | 1 | 3 | 3 | −3 | 1 | 3 | −1 | 3 | −1 | 3 | 3 | −3 | 3 | 1 | −1 | 3 | 3 |
| 24 | 1 | −1 | 3 | 3 | −1 | −3 | 3 | −3 | −1 | −1 | 3 | −1 | 3 | −1 | −1 | 1 | 1 | 1 | 1 | −1 | −1 | −3 | −1 | 3 |
| 25 | 1 | −1 | 1 | −1 | 3 | −1 | 3 | 1 | 1 | −1 | −1 | −3 | 1 | 1 | −3 | 1 | 3 | −3 | 1 | 1 | −3 | −3 | −1 | −1 |
| 26 | −3 | −1 | 1 | 3 | 1 | 1 | −3 | −1 | −1 | −3 | 3 | −3 | 3 | 1 | −3 | 3 | −3 | 1 | −1 | 1 | −3 | 1 | 1 | 1 |
| 27 | −1 | −3 | 3 | 3 | 1 | 1 | 3 | −1 | −3 | −1 | −1 | −1 | 3 | 1 | −3 | −3 | −1 | 3 | −3 | −1 | −3 | −1 | −3 | −1 |
| 28 | −1 | −3 | −1 | −1 | 1 | −3 | −1 | −1 | 1 | −1 | −3 | 1 | 1 | −3 | 1 | −3 | −3 | 3 | 1 | 1 | −1 | 3 | −1 | −1 |
| 29 | 1 | 1 | −1 | −1 | −3 | −1 | 3 | −1 | 3 | −1 | 1 | 3 | 1 | −1 | 3 | 1 | 3 | −3 | −3 | 1 | −1 | −1 | 1 | 3 |

Here, Nc=1600, $x_1(i)$ is a first m-sequence, and $x_2(i)$ is a second m-sequence. A pseudo random sequence generator may be initialized to $$c_{init} = \left\lfloor \frac{N_{ID}^{cell}}{30} \right\rfloor$$

in the first of each radio frame.

Definition of a sequence shift pattern $f_{ss}$ may be different for the PUCCH and PUSCH. The sequence shift pattern of the PUCCH may be $f_{ss}^{PUCCH} = N_{ID}^{cell}$ mod 30. The sequence shift pattern of the PUSCH may be $f_{ss}PUSCH = (f_{ss}^{PUCCH} + \Delta_{ss})$ mod 30 and $\Delta_{ss} \square \{0, 1, \ldots, 29\}$ may be configured by a higher layer.

Sequence hopping may be applied to only a reference signal sequence having a length longer than $6N_{sc}^{RB}$. For a reference signal sequence having a length shorter than $6N_{sc}^{RB}$, a basic sequence number v within a basic sequence group is 0. For a reference signal sequence having a length longer than $6N_{sc}^{RB}$, a basic sequence number v within a basic sequence group of a slot $n_s$ may be defined by Equation 10.

$$v = \begin{cases} c(n_s) & \text{if group hopping is disabled and sequence hopping is enabled} \\ 0 & \text{otherwise} \end{cases} \quad \text{(Equation 10)}$$

c(i) may be represented by an example of Equation 9. The sequence hopping may be enabled or not enabled by Sequence-hopping-enabled parameter, which is a cell-specific parameter, provided by a higher-layer. Further, the sequence hopping for PUSCH may be disabled for a specific UE by Disable-sequence-group-hopping parameter, which is a UE-specific parameter. A pseudo random sequence generator may be initialized to $$c_{init} = \left\lfloor \frac{N_{ID}^{cell}}{30} \right\rfloor \cdot 2^5 + f_{ss}^{PUSCH}$$

in the first of each radio frame.

PUSCH DMRS sequence $r_{PUSCH}^{(\lambda)}(.)$ according to layers $\lambda(0, 1, \ldots, \gamma-1)$ may be defined by Equation 11.

$$r_{PUSCH}^{(\lambda)}(m \cdot M_{sc}^{RS} + n) = w^{(\lambda)}(m) r_{u,v}^{(\alpha_\lambda)}(n) \quad \text{<Equation 11>}$$

In Equation 11, m=0, 1, . . . and n=0, . . . , $M_{sc}^{RS}$-1. $M_{sc}^{RS} = M_{sc}^{PUSCH}$. Orthogonal sequence $w(\lambda)(m)$ may be determined according to Table 4 described below.

$\alpha = 2\pi ncs/12$, that is, a cyclic shift is given within slot $n_s$, and $n_{cs}$ may be defined by Equation 12.

$$n_{cs} = (n_{DMRS}^{(1)} + n_{DMRS}^{(2)} + n_{PRS}(n_s)) \bmod 12 \quad \text{<Equation 12>}$$

In Equation 12, $n_{DMRS}^{(1)}$ may be determined by a cyclic-Shift parameter provided by a higher layer. Table 3 shows an example of $n_{DMRS}^{(1)}$ determined by the cyclicShift parameter.

TABLE 3

| Parameter | $n_{DMRS}^{(1)}$ |
| --- | --- |
| 0 | 0 |
| 1 | 2 |
| 2 | 3 |
| 3 | 4 |
| 4 | 6 |
| 5 | 8 |
| 6 | 9 |
| 7 | 10 |

Back in Equation 12, $n_{DMRS,\lambda}^{(2)}$ may be defined by a DMRS cyclic shift field within a DCI format 0 for a transport block according to corresponding PUSCH transmission. Table 4 shows an example of $n_{DMRS,\lambda}^{(2)}$ determined by the DMRS cyclic shift field.

TABLE 4

| DMRS cyclic shift field | $n_{DMRS,\lambda}^{(2)}$ | | | | $[w^{(\lambda)}(0) \; w^{(\lambda)}(1)]$ | | | |
| --- | --- | --- | --- | --- | --- | --- | --- | --- |
| | $\lambda=0$ | $\lambda=1$ | $\lambda=2$ | $\lambda=3$ | $\lambda=0$ | $\lambda=1$ | $\lambda=2$ | $\lambda=3$ |
| 000 | 0 | 6 | 3 | 9 | [1 1] | [1 1] | [1 -1] | [1 -1] |
| 001 | 6 | 0 | 9 | 3 | [1 -1] | [1 -1] | [1 1] | [1 1] |
| 010 | 3 | 9 | 6 | 0 | [1 -1] | [1 -1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 -1] | [1 -1] | [1 -1] | [1 -1] |
| 110 | 10 | 4 | 1 | 7 | [1 -1] | [1 -1] | [1 -1] | [1 -1] |
| 111 | 9 | 3 | 0 | 6 | [1 1] | [1 1] | [1 -1] | [1 -1] |

$n_{PN}(n_s)$ may be defined by Equation 13.

$$n_{PN}(n_s) = \sum_{i=0}^{7} c(8N_{symb}^{UL} \cdot n_s + i) \cdot 2^i \quad \text{<Equation 13>}$$

c(i) may be represented by the example of Equation 9 and may be applied in a cell-specific way of c(i). A pseudo random sequence generator may be initialized to $$c_{init} = \left\lfloor \frac{N_{ID}^{cell}}{30} \right\rfloor \cdot 2^5 + f_{ss}^{PUSCH}$$

in the first of each radio frame.

The vector of the reference signal may be precoded according to Equation 14 below.

$$\begin{bmatrix} \tilde{r}_{PUSCH}^{(0)} \\ \vdots \\ \tilde{r}_{PUSCH}^{(P-1)} \end{bmatrix} = W \begin{bmatrix} r_{PUSCH}^{(0)} \\ \vdots \\ r_{PUSCH}^{(v-1)} \end{bmatrix} \quad \text{<Equation 14>}$$

In Equation 14, P represents the number of the antenna ports which is used to transmit the PUSCH. W represents the precoding matrix. For the PUSCH transmission that uses a single antenna port, p=1, W=1, and r=1. In addition, for the spatial multiplexing, p=2 or 4.

For each antenna port which is used to transmit the PUSCH, the DMRS sequence is multiplied to the amplitude scaling factor, $\beta_{PUSCH}$, and sequentially mapped to the resource elements. The set of the physical resource blocks which is used in mapping is identical to the set of the physical resource blocks which is used in transmitting the corresponding PUSCH. In the subframe, the DMRS sequence may be mapped to the resource elements in the direction that the frequency is increasing in the frequency domain first, and in the direction that the slot number is increasing. The DMRS sequence may be mapped to the fourth SC-FDMA symbol in case of the normal CP, and mapped to the third SC-FDMA symbol (SC-FDMA symbol index 2) in case of the extended CP.

Hereinafter, a method for transmitting an uplink reference signal according to the present invention is described.

According to the discussion of the new deploying scenario in LTE-A rel-11, it may be required to improve the performance of the UL DMRS. In particular, in order to improve the performance of the UL DMRS, the sequence group allocation of the UL DMRS may be discussed through the newly employed deployment scenario. In the newly employed deployment scenario, the sequence group of the UL DMRS may be allocated in the cell-specific manner, or the same sequence group may be allocated for all the UL DMRS as described above. In order to compare the performance of the two methods of the sequence group allocation of the UL DMRS, the cross correlation characteristic between the cell-specific sequence group allocation method and the single sequence group allocation method may be measured. The single sequence group allocation method in the multiple cells may cause a significant inter-cell interference among the DMRS sequences that have different lengths. This is because the DMRS sequences that have high correlation among the DMRS sequences with a different length each other are grouped into the single sequence group.

Accordingly, it may be preferable to apply the cell-specific sequence group allocation method to the single sequence group allocation method. Especially, in the deployment scenarios including deploy deployment B, D or the like, the performance of the UL DMRS may be improved by using the cell-specific sequence group allocation method. However, in case that the macro cell and the multiple RRHs have the same cell ID such as deployment scenario A or C, the cell-specific sequence group allocation method may have the same performance as the single sequence group allocation method. That is, in deployment scenario A or C, the cell-specific sequence group allocation method may also cause significant inter-cell interference due to the high cross correlation among the UL DMRS sequences. In deployment scenario A or C, the different UEs may belong to each of the different nodes or RRHs that have the same cell ID. Each UE may perform the UL transmission by using the UL DMRS on the RBs that have different sizes while being overlapped. The performance of the UL demodulation with respect to each UE may be deteriorated by the multi-user interference that is occurred by the high correlation among the UL DMRS sequences with different lengths respectively. Accordingly, a method to improve the orthogonality of the UL DMRS may be proposed in the newly employed deployment scenario.

In order to solve the problems described above, various methods may be proposed according to the present invention.

1) Application of the cyclic shift: The cyclic shift may be applied to decrease the high correlation among the UL DMRS sequences that have different lengths respectively. However, as the number of the cell increases, it may be difficult to find the proper pair of the cyclic shifts among the combination including the UL DMRS sequences that have different lengths and the different sequence group. In addition, even in the case that the pair of the cyclic shift exists, there may be limit in the scheduling.

2) Application of the orthogonal cover code (OCC): In order to maintain the orthogonality of the UL DMRS among different UEs that have different bandwidths respectively, the OCC may be applied. Accordingly, the orthogonality of the UL DMRS among different UEs that have different bandwidths being included in different nodes or RRHs respectively may be guaranteed without any additional mechanism or signaling. The base station may allocate different OCCs, that is implicitly indicated by the cyclic shift index within the UL DCI format, to the UL DMRS sequence that have different lengths respectively. Alternatively, the base station may allocate different OCCs respectively, that is indicated by the OCC index, to the UL DMRS sequence that have a different length, and each OCC index is configured independently and explicitly transmitted. The OCC index corresponding to each UL DMRS sequence may be dynamically signaled through the PDCCH, or may be signaled through the radio resource control (RRC). In addition, it may be necessary to set up the Disable-sequence-group-hopping parameter, the UE-specific parameter, as enable for the DMRS multiplexing among different UEs that belong to different nodes or different RRHs respectively. That is, by setting the group hopping or the sequence hopping not to be applied to the UL DMRS sequence that is allocated to each slot of the subframe, the UEs that belong to different nodes or different RRHs with one another may be multiplexed in DMRS based on the OCC.

3) Application of the interleaved frequency division multiple access (IFDMA): By using the value of different transmission comb values for the UL DMRS such as in case of UL SRS transmission, the different UL DMRS sequences whose bandwidths are different among the UEs that belong to different nodes or different RRHs with one another that have the same cell ID may be divided in the frequency domain. However, a new sequence whose length is 6, 18, 30 or so needs to be designed in order to apply the IFDMA, which is the way that does not exist in the existing LTE rel-8/9/10.

4) Allocation of the virtual cell ID: In order to multiplex the DMRS among the UEs that belong to different nodes or different RRHs respectively, the virtual cell ID, which is not an ID of the cell to which each UE belongs, may be allocated to the each UE. The virtual cell ID may be a cell ID which is not an ID of the cell to which each UE belongs, or may be a cell ID which is not allocated to the cell ID or the pre-reserved cell ID for a specific scenario. The sequence group with respect to the UL DMRS of the corresponding UE may be allocated based on the different virtual cell IDs, not based on the cell ID, and accordingly, it may be possible to allocate different sequence groups with respect to the UL DMRS of each UE. Therefore, the high correlation among the UL DMRS sequences that have different lengths may be decreased.

Hereinafter, various methods for maintaining the orthogonality of the UL RS sequences that have different lengths as described above are described according to the specific deployment scenarios. In the description below, the UL RS includes the UL DMRS and the UL SRS. First, the case in which the method for transmitting the uplink reference signal proposed in the deployment scenario A, i.e., CoMP scenario 4, is applied is described.

Figure 6:
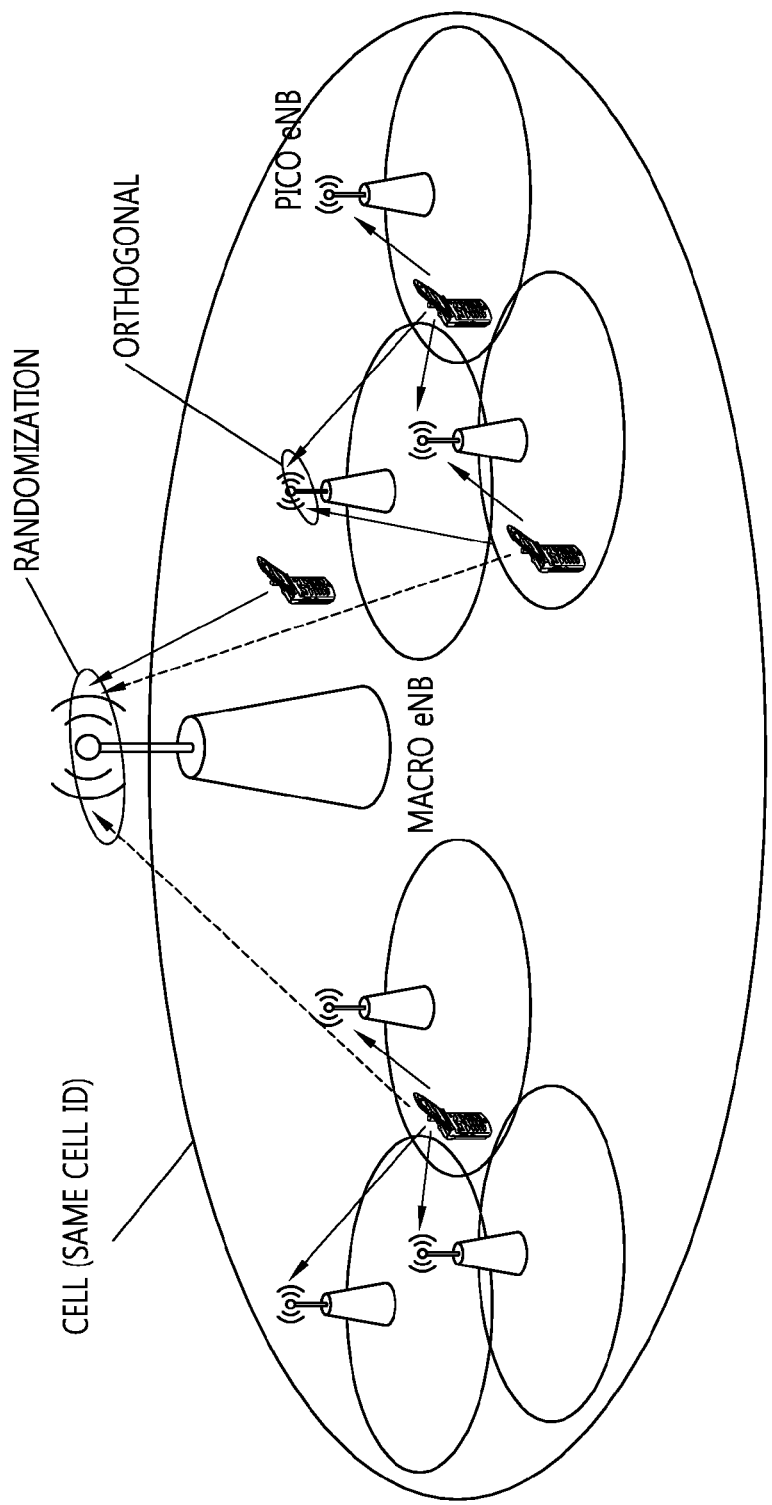
FIG. 6 shows an example of a deployment scenario of CoMP scenario 4.

FIG. 6 shows an example of a deployment scenario of CoMP scenario 4.

Referring to FIG. 6, the macro eNB provides the macro cell coverage. The multiple pico eNBs exist within the macro cell coverage. The macro eNB and the multiple pico eNBs have the same cell ID. The UE may be divided by the CoMP UE that performs the CoMP transmission and the non-CoMP UE that does not perform the CoMP transmission. The CoMP UE may receive the signal from the multiple eNBs by the downlink CoMP transmission, and may transmit the signal to the multiple eNBs by the uplink CoMP transmission. FIG. 6 shows an example of the uplink CoMP transmission, which the UE transmits the signal to the multiple eNBs. The signal which the macro eNB receives from the multiple UEs may be randomized. In addition, the UL RS that is transmitted by the multiple UEs respectively through the same bandwidth which corresponds to the same location in the frequency domain may maintain the orthogonality according to different cyclic shifts.

Figure 7:
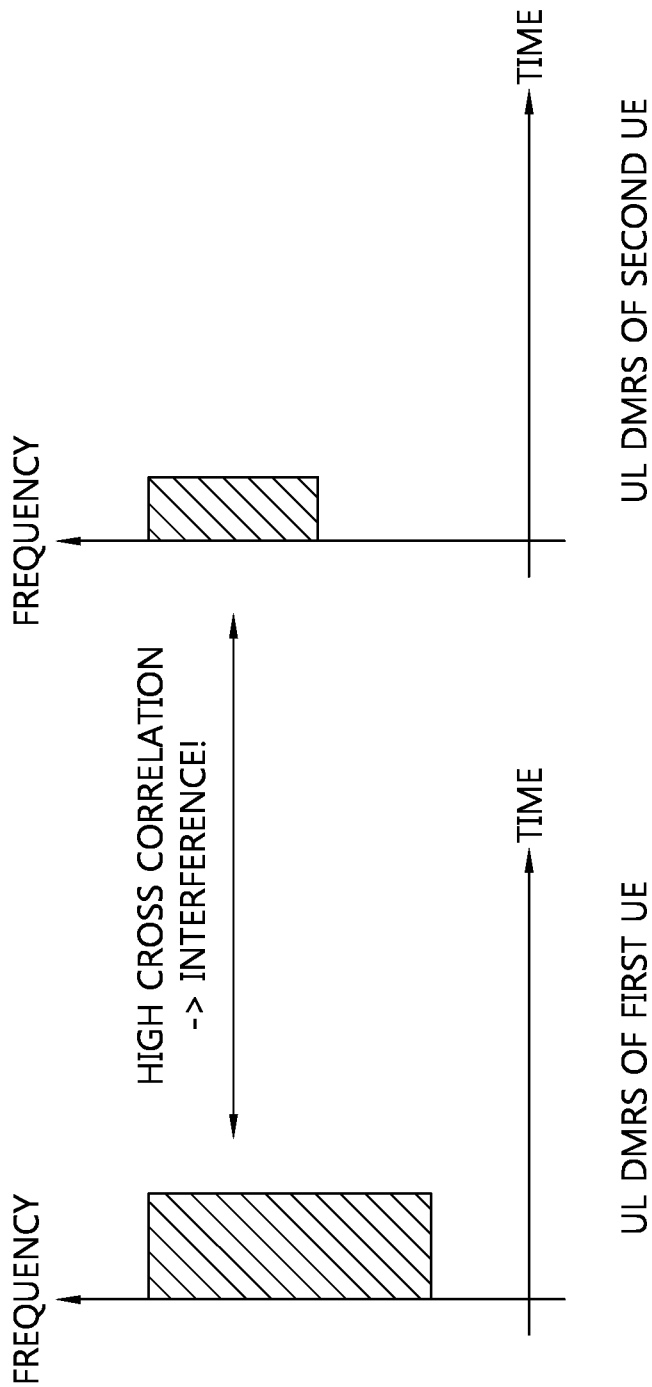
FIG. 7 shows a case in which UL RSs are transmitted respectively through non-identical overlapped bandwidths.

FIG. 7 shows a case in which UL RSs are transmitted respectively through non-identical overlapped bandwidths.

In FIG. 7, the first UE may be either one of the CoMP UE or the non-CoMP UE. In addition, the second UE may be either one of the CoMP UE or the non-CoMP UE. The bandwidth to which the first UE transmits the UL RS and which the second UE transmits the UL RS are mutually overlapped in the frequency domain, but not the same. If the first UE and the second UE belong to the different nodes or to the different RRHs respectively that have the same cell ID, high correlation may occur between the UL RS of the first UE and the UL RS of the second UE. Accordingly, the UL performance of the UE that may be obtained by the UL RS with the orthogonality may de deteriorated. Therefore, a method is required to solve it.

1) The sequence group of each UL RS may be allocated via the virtual cell ID, regardless of whether the UL RS transmitted by each of the multiple UEs is transmitted through the same bandwidth or through overlapped different bandwidth. Accordingly, if the multiple UEs transmit the UL RS through different bandwidth with being overlapped, the orthogonality may be maintained by different sequence groups being allocated to each UL RS.

2) If the UL RS transmitted by each of the multiple UEs is transmitted through the same bandwidth, different cyclic shift may be allocated to each UL RS. If the UL RS transmitted by each of the multiple UEs is transmitted through different bandwidth while being overlapped, the sequence group may be allocated to each UL RS via the virtual cell ID. The sequence group allocated based on the virtual cell ID may be applied to both of the UL DMRS sequence and the UL SRS sequence. In addition, if the multiple UEs transmit the UL DMRS through different bandwidth while being overlapped, different OCCs may be allocated to each UE, additionally. That is, for the UL DMRS that is mapped to each single SC-FDMA symbol in two slots, different OCCs whose length are 2 may be applied to the UL DMRS of the different UEs respectively. In this time, the cyclic shift hopping pattern of the UL DMRS among the slots may be configured based on the existing cell ID, not based on the virtual cell ID. That is, the virtual cell ID is only applied to generate the base sequence of the UL DMRS, and the cyclic shift hopping pattern among the slots may be configured based on the existing cell ID.

3) If the UL RS that each of the multiple UEs transmit may be transmitted through the same bandwidth, as described above, different cyclic shifts are allocated to each UL RS. If the LTL DMRS transmitted by each of the multiple UEs is transmitted through different bandwidth while being overlapped, different OCCs may be allocated to each UL DMRS. That is, for the UL DMRS that is mapped to each single SC-FDMA symbol in two slots, different OCCs whose length are 2 may be applied to the UL DMRS of the different UEs respectively. Each OCC corresponds to the OCC index. The OCC index which is allocated to each UE may be explicitly signaled through the PDCCH. That is, the OCC index may be signaled through the PDCCH with being added in the UL DCI format. The OCC index may be comprised of an additional 1 bit in the UL DCI format. Or, the OCC may be signaled through the RRC. Or, the OCC index may be implicitly indicated. For example, similar to the method for multiplexing among the layers in the LTE rel-10, it may be indicated to allocate different OCCs by allocating different CSI indices to each UE.

Meanwhile, since the UL SRS is mapped only to the last SC-FDMA symbol within a single subframe, which is different from the case of the UL DMRS, different OCCs cannot allocated to each UL SRS if the UL SRS transmitted by each of the multiple UEs is transmitted through different bandwidth while being overlapped. However, in case of the UL SRS, different from the UL DMRS, the UL SRS of the multiple UEs may be allocated to the different frequency domain within a single SRS symbol by using the transmission comb (0 or 1) using the repetition factor 2. In this time, each UL SRS may be allocated to the odd numbered or even numbered subcarriers. Accordingly, if the UL SRS transmitted by each of the multiple UEs is transmitted through the different bandwidth while being overlapped, different transmission comb may be allocated to each UL SRS. Each transmission comb corresponds to the transmission comb index. The transmission comb index which is allocated to each UE may be explicitly signaled through the PDCCH. That is, the transmission comb index may be signaled through the PDCCH with being added in the UL DCI format. Or, the transmission comb index may be signaled through the RRC. Or, the transmission comb index may be implicitly indicated. For example, similar to the method for multiplexing among the SRS antenna ports in the LTE rel-10, it may be indicated to allocate different transmission combs by configuring the transmission comb according to the corresponding $n_{SRS}^{cs}$.

Figure 8:
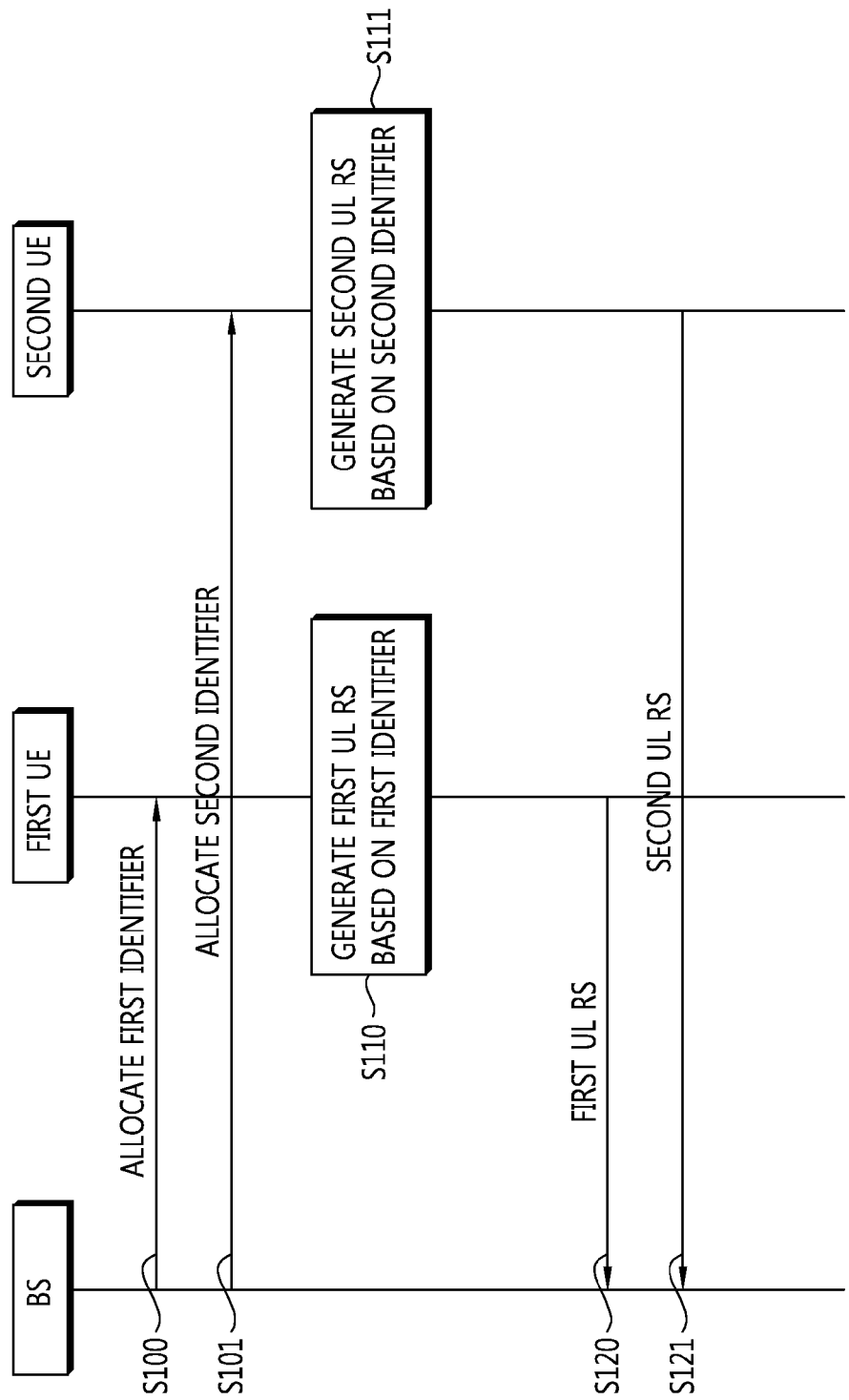
FIG. 8 shows an embodiment of a proposed method for transmitting an unlink reference signal.

FIG. 8 shows an embodiment of a proposed method for transmitting an unlink reference signal.

In step S100, the base station allocates a first identifier to a first UE, and in step S101, allocates a second identifier to a second UE. The first identifier and the second identifier may be one among different cyclic shifts, different virtual cell IDs, and different OCC indices or different transmission comb, which are required according to the method applied to maintain the orthogonality of the UL RS as described above. That is, if the UL RS transmitted by each of the multiple UEs is transmitted through different bandwidth while being overlapped and is generated based on the virtual cell ID, the first identifier and the second identifier may be the different virtual cell ID each other. Or, if the UL DMRS transmitted by each of the multiple UEs is transmitted through different bandwidth while being overlapped and different OCCs are allocated to each UE, the first identifier and the second identifier may be different OCC indices. If the UL SRS transmitted by each of the multiple UEs is transmitted through different bandwidth while being overlapped and different transmission combs are allocated to each UE, the first identifier and the second identifier may be different transmission comb indices.

In step S110, the first UE generates the first UL RS based on the first identifier, and in step S111, the second UE generates the second UL RS based on the second identifier. In steps S120 and S121, the first UE and the second UE transmit the first UL RS and the second UL RS which are respectively generated to the base station.

Hereinafter, the case in which the method for transmitting the uplink reference signal proposed in the deployment scenario D, i.e., CoMP scenario 3, is applied is described.

Figure 9:
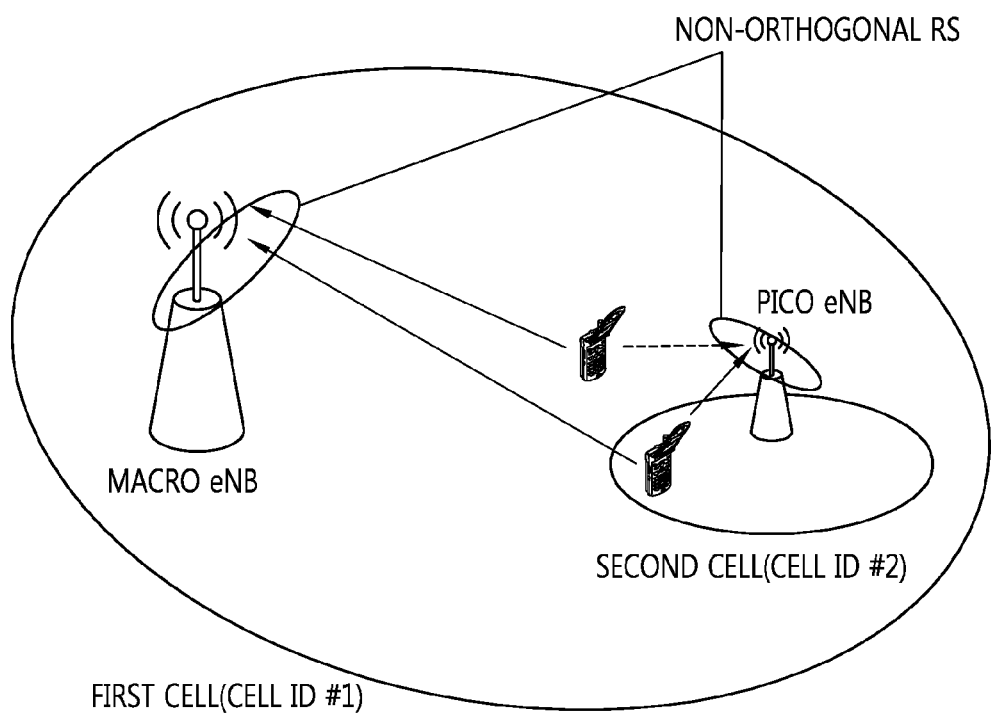
FIG. 9 shows an example of a deployment scenario of CoMP scenario 3.

FIG. 9 shows an example of a deployment scenario of CoMP scenario 3.

Referring to FIG. 9, CoMP scenario 3 may be referred to a heterogeneous network that has different cell IDs. The macro eNB provides a macro cell coverage. In FIG. 9, the macro eNB has cell ID #1. At least one pico eNB exists within the macro cell coverage. In FIG. 9, the pico eNB has cell ID #2. That is, the macro eNB and the pico eNB have different cell IDs. In CoMP scenario 3, the CoMP UE may perform the CoMP transmission with the macro eNB and the pico eNB. FIG. 9 shows an example of the uplink CoMP transmission in which the CoMP UE transmits a signal to the macro eNB and the pico eNB.

In CoMP scenario 3 as shown in FIG. 9, even in case the UL DMRS transmitted by each of the multiple UEs is transmitted through different bandwidth while being overlapped, high correlation among the UL RS sequences does not occur because the UL RS sequence is generated based on different cell IDs. That is, the UL RS transmitted by the multiple UEs are not orthogonal. However, if the CoMP UE performs the uplink CoMP transmission, the performance gain may be improved by the orthogonality of UL RS among cells. Accordingly, a method may be required to guarantee the orthogonality among the UL RSs which are transmitted by the multiple UEs even in CoMP scenario 3 as well.

1) The sequence group of each UL RS may be allocated via the virtual cell ID, regardless of whether the UL RS transmitted by each of the multiple UEs is transmitted through the same bandwidth or through overlapped different bandwidth. Accordingly, if the multiple UEs transmit the UL RS through different bandwidth while being overlapped, the orthogonality may be maintained as different sequence groups are allocated to each UL RS.

2) If the UL RS transmitted by each of the multiple UEs is transmitted through the same bandwidth, different virtual cell IDs may be allocated to each UL RS. Different sequence groups may be allocated to each UL RS which are transmitted by the multiple UEs respectively by the different virtual cell IDs. The virtual cell ID may be signaled through the PDCCH, or RRC signaled.

If each of the multiple UEs transmits the UL RS through different bandwidth while being overlapped, different cyclic shifts may be allocated to each UL RS. In addition, if each of the multiple UEs transmits the UL DMRS through the respectively different bandwidth while being overlapped, different OCCs may be allocated to each UE, additionally. That is, for the UL DMRS that is mapped to each single SC-FDMA symbol in two slots, different OCCs whose length are 2 may be applied to the UL DMRS of the different UEs respectively. In this time, the cyclic shift hopping pattern of the UL DMRS among the slots may be configured based on the existing cell ID. Or, the cyclic shift hopping among the slots of the UL DMRS may not be applied. Or, the group hopping and the sequence hopping among the slots of the UL DMRS may also not be applied.

Each OCC corresponds to the OCC index. The OCC index which is allocated to each UE may be explicitly signaled through the PDCCH. That is, the OCC index may be signaled through the PDCCH with being added in the UL DCI format. The OCC index may be comprised of an additional 1 bit in the UL DCI format. Or, the OCC index may be signaled through the RRC. Or, the OCC index may be implicitly indicated. For example, similar to the method for multiplexing among the layers in the LTE rel-10, it may be indicated to allocate different OCCs to each UE by allocating different CSI indices.

If the UL SRS transmitted by each of the multiple UEs is transmitted through different bandwidth while being overlapped, different transmission comb may be allocated to each UL SRS. Each transmission comb corresponds to the transmission comb index. The transmission comb index which is allocated to each UE may be explicitly signaled through the PDCCH. That is, the transmission comb index may be signaled through the PDCCH with being added in the UL DCI format. Or, the transmission comb index may be RRC signaled. Or, the transmission comb index may be implicitly indicated. For example, similar to the method for multiplexing among the SRS antenna ports in the LTE rel-10, it may be indicated to allocate different transmission combs by configuring the transmission comb according to the corresponding $n_{SRS}^{cs}$.

3) Different OCCs may be allocated to each UL DMRS. That is, for the UL DMRS that is mapped to each single SC-FDMA symbol in two slots, different OCCs whose length are 2 may be applied to the UL DMRS of the different UEs respectively. In this time, the cyclic shift hopping of the UL DMRS among the slots may not be applied. Or, the group hopping and the sequence hopping among the slots of the UL DMRS may also not be applied. Each OCC corresponds to the OCC index. The OCC index which is allocated to each UE may be explicitly signaled through the PDCCH. That is, the OCC index may be signaled through the PDCCH with being added in the UL DCI format. The OCC index may be comprised of an additional 1 bit in the UL DCI format. Or, the OCC index may be signaled through the RRC. Or, the OCC index may be implicitly indicated. For example, similar to the method for multiplexing among the layers in the LTE rel-10, it may be indicated to allocate different OCCs each UE by allocating different CSI indices.

Meanwhile, in the description above, it is assumed that the Disable-sequence-group-hopping parameter, the UE-specific parameter, is set to enabled for the DMRS multiplexing among different UEs that belong to different nodes or different RRHs respectively. That is, it is assumed that the base sequence of the UL RS among the slots does not change. As the group hopping or the sequence hopping being set not to be applied to the UL DMRS sequence that is allocated to each slot of the subframe, the UEs that belong to different nodes or different RRHs with one another may be multiplexed in DMRS based on the OCC.

The description below is a mathematical analysis of the method for set up the group hopping, the sequence hopping and the cyclic shift hopping in order to guarantee the orthogonality of the RS among the cells.

The first UL DMRS of the first UE which is allocated to the first RB (RB1) in the frequency domain may be represented by Equation 15 according to the slot.

$$r_{UE_1,s_1}(n) = \exp(j\alpha_{1,1}n) r_{u_A,v_A}^{(N_{RB1})}(n)$$

$$r_{UE_1,s_2}(n) = \exp(j\alpha_{1,2}n) r_{u_{A+c},v_{A+c}}^{(N_{RB1})}(n) \qquad \text{<Equation 15>}$$

The second UL DMRS of the second UE which is allocated to the second RB (RB2) in the frequency domain may be represented by Equation 16 according to the slot.

$$r_{UE_2,s_1}(n) = \exp(j\alpha_{2,1}n) r_{u_B,v_B}^{(N_{RB2})}(n)$$

$$r_{UE_2,s_2}(n) = \exp(j\alpha_{2,2}n) r_{u_{B+d},v_{B+d}}^{(N_{RB2})}(n) \quad \text{<Equation 16>}$$

If the first UL DMRS and the second UL DMRS are overlapped in the frequency domain, the receiving signal $Y_{s1}$ in the first slot and the receiving signal $Y_{s2}$ in the second slot may represented by Equation 17.

$$Y_{s1} = r_{UE_1,s_1} + r_{UE_2,s_1}$$

$$Y_{s2} = r_{UE_1,s_2} + r_{UE_2,s_2} \quad \text{<Equation 17>}$$

In addition, if the OCC of [1 1] is applied to the first UE and the OCC of [1 −1] to the second UE, the receiving signal $Y_{s1}$ in the first slot and the receiving signal $Y_{s2}$ in the second slot may represented by Equation 18.

$$Y_{s1} = (+1) \cdot r_{UE_1,s_1} + (+1) \cdot r_{UE_2,s_1} = \exp(j\alpha_{1,1}n) r_{u_A,v_A}^{(N_{RB1})}(n) + \exp(j\alpha_{2,1}n) r_{u_B,v_B}^{(N_{RB2})}(n)$$

$$Y_{s2} = (+1) \cdot r_{UE_1,s_2} + (-1) \cdot r_{UE_2,s_2} = \exp(j\alpha_{1,2}n) r_{u_{A+c},v_{A+c}}^{(N_{RB1})}(n) - \exp(j\alpha_{2,2}n) r_{u_{B+d},v_{B+d}}^{(N_{RB2})}(n) \quad \text{<Equation 18>}$$

Accordingly, the channel estimation of the second UE may be performed by using Equation 19. In Equation 19, the channel estimation of the second UE is exemplified, but the channel estimation of the first UE may be performed in the same way.

indicate the group hopping and the sequence hopping is 0, the following conditions are satisfied as $r_{u_A,v_A}^{(N_{RB1})}(n) = r_{u_{A+c},v_{A+c}}^{(N_{RB1})}(n)$, $r_{u_B,v_B}^{(N_{RB2})}(n) = r_{u_{B+d},v_{B+d}}^{(N_{RB2})}(n)$. Accordingly, since the term of the RS interference in Equation 19 becomes 0, the UL RSs among the corresponding UEs are orthogonal with one another.

Otherwise, it may be assumed that $N_{RB1} = N_{RB2}$, that is, the bandwidths through which the first UL DMRS and the second UL DMRS are transmitted are the same. In this case, even if the group hopping or the sequence hopping among the slots is applied, the orthogonality among the corresponding UL DMRS is guaranteed if $r_{u_A,v_A}^{(N_{RB1})}(n) = r_{u_{B+d},v_{B+d}}^{(N_{RB2})}(n)$, $r_{u_B,v_B}^{(N_{RB2})}(n) = r_{u_{A+c},v_{A+c}}^{(N_{RB2})}(n)$.

2) In case of CoMP scenario 4, since the macro eNB and the pico eNB have the same cell ID, the UL RSs among the multiple UEs are orthogonal as same as the MU-MIMO. That is, if the cyclic shift hopping pattern of cells is set up identically and the group hopping or the sequence hopping among the slots is not applied, the UL RSs among the multiple UEs may be orthogonal with one another in CoMP scenario 4. In this time, the cyclic shift hopping pattern among the UEs may be set up identically, which belong to different cells, by setting up $\Delta_{ss}$ with UE-specific, which is configured by the high layer with cell-specific manner. Whether the $\Delta_{ss}$ is allocated by the cell-specific manner as the existing method or by the UE-specific manner may be explicitly signaled through the RRC, or implicitly signaled. Otherwise, it may be signaled through the RRC whether it $$\begin{aligned}
\psi_{UE2} &= Y_{s1}(r_{UE_2,s_1})^* - Y_{s2}(r_{UE_2,s_2})^* \\
&= \sum_{n=0}^{12N_{RB2}-1} (r_{UE_1,s_1}(n) + r_{UE_2,s_1}(n))(r_{UE_2,s_1}(n))^* - \\
&\quad \sum_{n=0}^{12N_{RB2}-1} (r_{UE_1,s_2}(n) - r_{UE_2,s_2}(n))(r_{UE_2,s_2}(n))^* \\
&= \sum_{n=0}^{12N_{RB2}-1} \{\exp(j\alpha_{1,1}n) r_{u_A,v_A}^{(N_{RB1})}(n) + \exp(j\alpha_{2,1}n) r_{u_B,v_B}^{(N_{RB2})}(n)\}\{\exp(j\alpha_{2,1}n) r_{u_B,v_B}^{(N_{RB2})}(n)\}^* - \\
&\quad \sum_{n=0}^{12N_{RB2}-1} \left\{ \begin{array}{l} \exp(j\alpha_{1,2}n) r_{u_{A+c},v_{A+c}}^{(N_{RB1})}(n) - \\ \exp(j\alpha_{2,2}n) r_{u_{B+d},v_{B+d}}^{(N_{RB2})}(n) \end{array} \right\} \{\exp(j\alpha_{2,2}n) r_{u_{B+d},v_{B+d}}^{(N_{RB2})}(n)\}^* \\
&= \sum_{n=0}^{12N_{RB2}-1} \exp(j\alpha_{1,1}n) r_{u_A,v_A}^{(N_{RB1})}(n) \exp(-j\alpha_{2,1}n) r_{u_B,v_B}^{(N_{RB2})}(n) - \\
&\quad \sum_{n=0}^{12N_{RB2}-1} \exp(j\alpha_{1,2}n) r_{u_{A+c},v_{A+c}}^{(N_{RB1})}(n) \exp(-j\alpha_{2,2}n) r_{u_{B+d},v_{B+d}}^{(N_{RB2})}(n) \\
&= \underbrace{\sum_{n=0}^{12N_{RB2}-1} \exp(j(\alpha_{1,1} - \alpha_{2,1})n) \cdot r_{u_A,v_A}^{(N_{RB1})}(n) \cdot r_{u_B,v_B}^{(N_{RB2})}(n) - \sum_{n=0}^{12N_{RB2}-1} \exp(j(\alpha_{1,2} - \alpha_{2,2})n) \cdot r_{u_{A+c},v_{A+c}}^{(N_{RB1})}(n) \cdot r_{u_{B+d},v_{B+d}}^{(N_{RB2})}(n)}_{\text{RS interference term}} + 2\varepsilon
\end{aligned} \quad \langle \text{Equation 19} \rangle$$

In Equation 19, the orthogonality among UEs may be guaranteed if the RS interference term is 0.

1) In case of the MU-MINO in which the multiple UEs perform the MIMO transmission with respect to a single base station, the cyclic shift hopping pattern is the same under the same cell ID. Accordingly, the following condition is satisfied as $\alpha_{1,1} - \alpha_{1,2} = \alpha_{2,1} - \alpha_{2,2}$ and $\alpha_{1,1} - \alpha_{2,1} = \alpha_{1,2} - \alpha_{2,2}$. In addition, if the group hopping or the sequence hopping among the slots is not applied, since the constant c and d that is possible to allocate the $\Delta_{ss}$ with UE-specific, and if possible, it may be explicitly signaled through the PDCCH whether the $\Delta_{ss}$ is allocated by the cell-specific manner or by the UE-specific manner. That is, an indicator that indicates whether the $\Delta_{ss}$ is allocated by the cell-specific manner or by the UE-specific manner may be included in the UL DCI format. Accordingly, the mutual compatibility is maintained between the legacy UE of the LTE rel-8/9/10, etc, and the UE of the LTE rel-11, and also, the performance deterioration of the existing legacy UE may be prevented.

Otherwise, it may be assumed that $N_{RB1}=N_{RB2}$, that is, the bandwidth through which the first UL DMRS and the second UL DMRS are transmitted are the same. In this case, even if the group hopping or the sequence hopping among the slots is applied, the orthogonality among the corresponding UL DMRS is guaranteed if $r_{u_A,v_A}^{(N_{RB1})}(n)=r_{u_{B+d},v_{B+d}}^{(N_{RB2})}(n)$, $r_{u_B,v_B}^{(N_{RB2})}(n)=r_{u_{A+c},v_{A+c}}^{(N_{RB2})}(n)$.

3) In case of CoMP scenario 3, since the macro eNB and the pico eNB have different cell IDs, the sequence group number or the sequence number allocated to each UL DMRS may be different. However, even in this case, if the group hopping or the sequence hopping among the slots is not applied, and if the cyclic shift hopping pattern among cells is not applied or the cyclic shift is set up to satisfy the condition, $\alpha_{1,1}-\alpha_{2,1}=\alpha_{1,2}-\alpha_{2,2}$, the UL RSs among the multiple UEs that belong to different cells may be orthogonal with one another.

A method of identically setting up the cyclic shift hopping pattern among different cells may be considered in order to minimize the interference randomization and the inter-cell interference while maintaining the cyclic shift hopping mechanism defined in the legacy system, and to avoid the occurrence of high correlation among the UL DMRSs of different lengths which are transmitted through different bandwidths. To this end, the cyclic shift hopping pattern among the UEs, which belong to different cells, may be set up identically by setting up the $\Delta_{ss}$ with UE-specific, which is configured by the higher layer with cell-specific manner. Whether the $\Delta_{ss}$ is allocated by the cell-specific manner as the existing method or by the UE-specific manner may be explicitly signaled by the RRC, or implicitly signaled. Otherwise, it is signaled whether it is possible to allocate the $\Delta_{ss}$ with UE-specific by the RRC, and if possible, if may be explicitly signaled by the PDCCH whether the $\Delta_{ss}$ is allocated by the cell-specific manner or by the UE-specific manner. That is, an indicator that indicates whether the $\Delta_{ss}$ is allocated by the cell-specific manner or by the UE-specific manner may be included in the UL DCI format. Accordingly, the mutual compatibility is maintained between the legacy UE of the LTE rel-8/9/10 and so on, and the UE of the LTE rel-11, and also, the performance deterioration of the existing legacy UE may be presented.

Otherwise, it may be assumed that $N_{RB1}=N_{RB2}$, the bandwidths through which the first UL DMRS and the second UL DMRS are transmitted are the same. In this case, even if the group hopping or the sequence hopping among the slots is applied, the orthogonality among the corresponding UL DMRS is guaranteed if $r_{u_A,v_A}^{(N_{RB1})}(n)=r_{u_{B+d},v_{B+d}}^{(N_{RB2})}(n)$, $r_{u_B,v_B}^{(N_{RB2})}(n)=r_{u_{A+c},v_{A+c}}^{(N_{RB2})}(n)$.

Or, in order to set up the cyclic shift hopping pattern identically among different cells, the $n_{PN}(n_s)$ which is used to determine the cyclic shift of the UL DMRS according to Equation 12 may be determined further based on a UE-specific parameter. That is, the $n_{PN}(n_s)$ may be determined according to the new equation in which a UE-specific parameter is added to Equation 13. The new equation in which a UE-specific parameter is added may have various forms.

In detail, the $n_{PN}(n_s)$ may be determined according to Equation 13 described above, the pseudo-random sequence generator may be initialized with $c_{init}(N_{ID}^{cell}, f_{ss}^{PUSCH}, X)$ at the beginning of each radio frame. X is a newly added UE-specific parameter. The conventional $c_{init}$ with which the pseudo-random sequence generator is initialized may be represented as the Equation 20 below.

$$c_{init} = \left\lfloor \frac{N_{ID}^{cell}}{30} \right\rfloor \cdot 2^5 + f_{ss}^{PUSCH} \qquad \langle \text{Equation 20} \rangle$$

$$= \left\lfloor \frac{N_{ID}^{cell}}{30} \right\rfloor \cdot 2^5 + [\{(N_{ID}^{cell} \bmod 30) + \Delta_{ss}\} \bmod 30]$$

A UE-specific parameter may be added to Equation 20 according to the present invention. Equation 21 below represents an example of the $c_{init}$ with which the pseudo-random sequence generator is initialized according to the present invention.

$$c_{init} = \left\lfloor \frac{N_{ID}^{cell}}{30} \right\rfloor \cdot 2^5 + f_{ss}^{PUSCH} \qquad \langle \text{Equation 21} \rangle$$

$$= \left\lfloor \frac{N_{ID}^{cell}}{30} \right\rfloor \cdot 2^5 + [\{(N_{ID}^{cell} \bmod 30) + \Delta_{SS} + \Delta_{CS\_hopping}\} \bmod 30]$$

In Equation 21, the $\Delta_{CS\_hopping}$ is newly added UE-specific parameter. The $\Delta_{CS\_hopping}$ may have one value in the range of 0 to 29. The value of the $\Delta_{CS\_hopping}$ may be configured through the higher layer. If the value of the $\Delta_{CS\_hopping}$ is configured, whether the $\Delta_{CS\_hopping}$ is applied may be indicated through the PDCCH. If the $\Delta_{CS\_hopping}$ is not applied, $\Delta_{CS\_hopping}=0$. Or, if the value of the $\Delta_{CS\_hopping}$ is not configured, $\Delta_{CS\_hopping}=0$. Or, the value of the $\Delta_{CS\_hopping}$ may be configured by the UE-specific manner through the PDCCH.

Equation 22 below represents another example of the $c_{init}$ in with which the pseudo-random sequence generator is initialized according to the present invention.

$$c_{init} = \left\lfloor \frac{N_{ID}^{cell}}{30} \right\rfloor \cdot 2^5 + (f_{ss}^{PUSCH} + \Delta_{CS\_hopping}) \bmod 30 \qquad \langle \text{Equation 22} \rangle$$

In Equation 22, the $\Delta_{CS\_hopping}$ is a newly added UE-specific parameter. The $\Delta_{CS\_hopping}$ may have one value in the range of 0 to 29. The value of the $\Delta_{CS\_hopping}$ may be configured through the higher layer. If the value of the $\Delta_{CS\_hopping}$ is configured, whether the $\Delta_{CS\_hopping}$ is applied may be indicated through the PDCCH. If the $\Delta_{CS\_hopping}$ is not applied, $\Delta_{CS\_hopping}=0$. Or, if the value of the $\Delta_{CS\_hopping}$ is not configured, $\Delta_{CS\_hopping}=0$. Or, the value of the $\Delta_{CS\_hopping}$ may be configured by the UE-specific manner through the higher layer.

Otherwise, the cyclic shift hopping pattern may be generated by setting up the cell ID identically. That is, the cyclic shift hopping pattern may be generated by the virtual ID. The virtual ID of which purpose is to set up the cyclic shift hopping pattern identically may be signaled through the PDCCH. That is, the virtual ID may be signaled with being added in the UL DCI format. Or, the virtual ID may be signaled through the RRC. Or, whether it is possible to use the virtual ID may be signaled through the RRC, and if possible, an indicator to indicate it may be signaled through the PDCCH. Or, the virtual ID may be allocated through the RRC signaling, and whether it is possible to use the corresponding virtual ID may be signaled through the PDCCH. Accordingly, the mutual compatibility is maintained between the legacy UE and the UE of the LTE rel-11, and, the performance deterioration of the existing legacy UE may be prevented.

Meanwhile, in the heterogeneous network that includes the macro eNB and the pico eNB, the macro eNB and the pico eNB may perform scheduling independently. In case of trying to guarantee the orthogonality of the UL DMRS among the UEs that belong to different cells through the virtual cell IDs, it may not be guaranteed that the same group hopping, sequence hopping and cyclic shift hopping are applied to different UEs. The macro eNB and the pico eNB may divide the UEs independently by using the cell-specific parameter. If the corresponding information is not exchanged between the macro eNB and the pico eNB, whether the same group hopping, sequence hopping and cyclic shift hopping are applied among different UEs is not exactly acknowledged. That is, the cyclic shift multiplexing cannot be performed among different UEs. To this end, it may be proposed that the macro eNB and the pico eNB exchange the corresponding information through the X2 interface. Accordingly, even if the macro eNB and the pico eNB may perform scheduling independently, the orthogonality of the UL DMRS through the cyclic shift and/or the OCC may be guaranteed by using the exchanged corresponding information.

Figure 10:
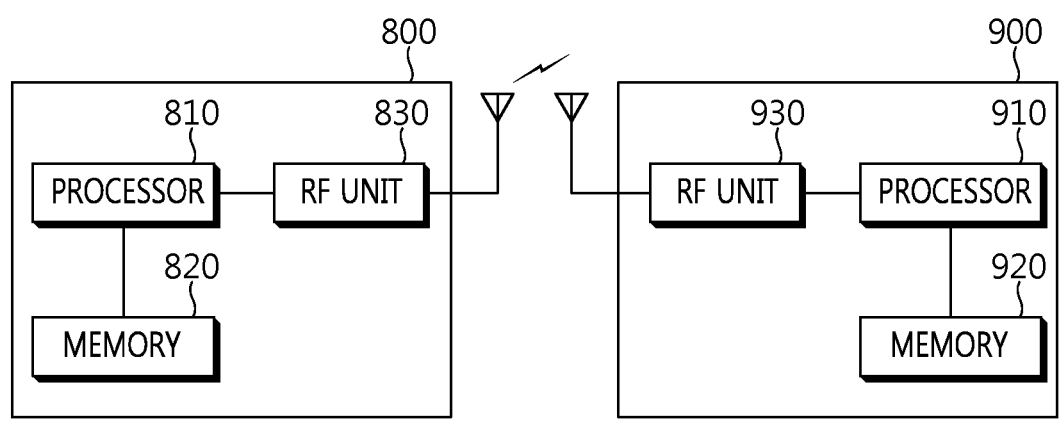
FIG. 10 is a block diagram showing wireless communication system to implement an embodiment of the present invention.

FIG. 10 is a block diagram showing wireless communication system to implement an embodiment of the present invention.

A BS 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for transmitting, by a user equipment (UE), a reference signal in a wireless communication system, the method comprising:
configuring a virtual cell identity (ID) which is different from a physical cell ID;
generating a first pseudo-random sequence which is initialized by using the virtual cell ID;
obtaining a group hopping pattern by using the first pseudo-random sequence;
obtaining a sequence shift pattern by using the virtual cell ID;
obtaining a sequence group number of a base sequence by using the group hopping pattern and the sequence shift pattern;
generating the base sequence by using the sequence group number; and
transmitting a reference signal, which is generated by using the base sequence, to an eNodeB (eNB).

2. The method of claim 1, wherein the first pseudo-random sequence is initialized with $$c_{init} = \left\lfloor \frac{n_{ID}^{RS}}{30} \right\rfloor,$$

where the $n_{ID}^{RS}$ is the virtual cell ID.

3. The method of claim 1, further comprising:
obtaining a base sequence number of the base sequence by using the virtual cell ID,
wherein the base sequence is generated further by using the base sequence number.

4. The method of claim 3, wherein the obtaining the base sequence number comprises:
generating a second pseudo-random sequence which is initialized by using the virtual cell ID; and
obtaining the base sequence number by using the second pseudo-random sequence.

5. The method of claim 4, wherein the second pseudo-random sequence is initialized with $$c_{init} = \left\lfloor \frac{n_{ID}^{RS}}{30} \right\rfloor \cdot 2^5 + f_{ss}^{PUSCH},$$

where the $n_{ID}^{RS}$ is the virtual cell ID.

6. The method of claim 1, wherein the virtual cell ID is configured by a higher layer from the eNB.

7. The method of claim 1, wherein the reference signal is a demodulation reference signal for a physical uplink shared channel (PUSCH).

8. The method of claim 7, wherein the demodulation reference signal for the PUSCH is generated by using a cyclic shift hopping pattern for each slot.

9. The method of claim 8, wherein the cyclic shift hopping pattern for each slot is obtained by using the virtual cell ID.

10. The method of claim 9, wherein the obtaining the cyclic shift hopping pattern for each slot comprises:
   generating a third pseudo-random sequence which is initialized by using the virtual cell ID; and
   obtaining the cyclic shift hopping pattern for each slot by using the third pseudo-random sequence.

11. The method of claim 1, wherein the reference signal is a demodulation reference signal for a physical uplink control channel (PUCCH).

12. The method of claim 1, wherein the reference signal is a sounding reference signal (SRS).

13. The method of claim 1, wherein the eNB is either a macro eNB or a pico eNB.

14. A user equipment (UE) in a wireless communication system, the UE comprising:
   a radio frequency (RF) unit for transmitting or receiving a radio signal; and
   a processor coupled to the RF unit, and configured to:
      configure a virtual cell identity (ID) which is different from a physical cell ID;
      generate a first pseudo-random sequence which is initialized by using the virtual cell ID;
      obtain a group hopping pattern by using the first pseudo-random sequence;
      obtain a sequence shift pattern by using the virtual cell ID;
      obtain a sequence group number of a base sequence by using the group hopping pattern and the sequence shift pattern;
      generate the base sequence by using the sequence group number; and
      transmit a reference signal, which is generated by using the base sequence, to an eNodeB (eNB).

* * * * *